United States Patent
McAlister et al.

(10) Patent No.: US 12,373,311 B2
(45) Date of Patent: Jul. 29, 2025

(54) FAILOVER AND RECOVERY FOR REPLICATED DATA INSTANCES

(71) Applicant: Amazon Technologies, Inc., Seattle, WA (US)

(72) Inventors: Grant Alexander MacDonald McAlister, Seattle, WA (US); Swaminathan Sivasubramanian, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 91 days.

(21) Appl. No.: 18/331,881

(22) Filed: Jun. 8, 2023

(65) Prior Publication Data

US 2023/0393953 A1     Dec. 7, 2023

Related U.S. Application Data

(63) Continuation of application No. 17/112,731, filed on Dec. 4, 2020, now Pat. No. 11,714,726, which is a
(Continued)

(51) Int. Cl.
  *G06F 11/00*      (2006.01)
  *G06F 11/14*      (2006.01)
  (Continued)

(52) U.S. Cl.
  CPC ...... *G06F 11/1469* (2013.01); *G06F 11/1443* (2013.01); *G06F 11/1451* (2013.01);
  (Continued)

(58) Field of Classification Search
  CPC ............ G06F 11/2069; G06F 11/3006; G06F 11/2082; G06F 11/2025; G06F 11/2056;
  (Continued)

(56) References Cited

U.S. PATENT DOCUMENTS

| | | |
|---|---|---|
| 5,555,404 A | 9/1996 | Torbjørnsen et al. |
| 6,018,746 A | 1/2000 | Hill et al. |

(Continued)

FOREIGN PATENT DOCUMENTS

| | | |
|---|---|---|
| CN | 101099172 | 1/2008 |
| CN | 101501668 | 8/2009 |

(Continued)

OTHER PUBLICATIONS

International Search Report mailed on Dec. 21, 2010, for International Application No. PCT/US10/54139 filed on Oct. 26, 2010, 2 pages.
(Continued)

*Primary Examiner* — Charles Ehne

(74) *Attorney, Agent, or Firm* — S. Scott Foster; Kowert, Hood, Munyon, Rankin & Goetzel, P.C.

(57) ABSTRACT

Replicated instances in a database environment provide for automatic failover and recovery. A monitoring component can periodically communicate with a primary and a secondary replica for an instance, with each capable of residing in a separate data zone or geographic location to provide a level of reliability and availability. A database running on the primary instance can have information synchronously replicated to the secondary replica at a block level, such that the primary and secondary replicas are in sync. In the event that the monitoring component is not able to communicate with one of the replicas, the monitoring component can attempt to determine whether those replicas can communicate with each other, as well as whether the replicas have the same data generation version. Depending on the state information,
(Continued)

the monitoring component can automatically perform a recovery operation, such as to failover to the secondary replica or perform secondary replica recovery.

20 Claims, 10 Drawing Sheets

Related U.S. Application Data continuation of application No. 15/811,565, filed on Nov. 13, 2017, now Pat. No. 10,860,439, which is a continuation of application No. 15/083,210, filed on Mar. 28, 2016, now Pat. No. 9,817,727, which is a continuation of application No. 14/089,616, filed on Nov. 25, 2013, now Pat. No. 9,298,728, which is a continuation of application No. 13/299,601, filed on Nov. 18, 2011, now Pat. No. 8,595,547, which is a continuation of application No. 12/606,097, filed on Oct. 26, 2009, now Pat. No. 8,074,107.

(51) Int. Cl.
 G06F 11/20 (2006.01)
 G06F 11/30 (2006.01)
 G06F 16/178 (2019.01)
 G06F 16/27 (2019.01)

(52) U.S. Cl.
 CPC ...... *G06F 11/1464* (2013.01); *G06F 11/2025* (2013.01); *G06F 11/2056* (2013.01); *G06F 11/2064* (2013.01); *G06F 11/2069* (2013.01); *G06F 11/2082* (2013.01); *G06F 11/3006* (2013.01); *G06F 16/178* (2019.01); *G06F 16/275* (2019.01); *G06F 11/2028* (2013.01); *G06F 11/2041* (2013.01); *G06F 11/2048* (2013.01); *G06F 11/2076* (2013.01)

(58) Field of Classification Search
 CPC ............. G06F 11/0727; G06F 11/2033; G06F 11/2023
 See application file for complete search history.

(56) References Cited

U.S. PATENT DOCUMENTS

| | | | |
|---|---|---|---|
| 6,205,465 B1 | 3/2001 | Schoening et al. | |
| 6,442,707 B1 | 8/2002 | McGarth et al. | |
| 6,542,907 B1 | 4/2003 | Cohen | |
| 6,560,639 B1 | 5/2003 | Dan et al. | |
| 6,611,867 B1 | 8/2003 | Bowman-Amuah | |
| 6,671,821 B1 | 12/2003 | Castro et al. | |
| 6,675,229 B1 | 1/2004 | Porter et al. | |
| 6,718,481 B1 | 4/2004 | Fair | |
| 6,961,768 B2 | 11/2005 | Davis et al. | |
| 6,981,135 B1 | 12/2005 | Trask | |
| 6,985,955 B2 | 1/2006 | Gullotta et al. | |
| 6,988,139 B1 | 1/2006 | Jervis et al. | |
| 7,062,559 B2 | 6/2006 | Yoshimura et al. | |
| 7,065,624 B1 | 6/2006 | Zahavi | |
| 7,111,194 B1 | 9/2006 | Schoenthal et al. | |
| 7,124,289 B1 | 10/2006 | Suorsa | |
| 7,133,907 B2 | 11/2006 | Carlson et al. | |
| 7,315,826 B1 | 1/2008 | Guheen et al. | |
| 7,363,382 B1* | 4/2008 | Bakke ................ | H04L 67/1097 709/239 |
| 7,415,484 B1 | 8/2008 | Tulkoff et al. | |
| 7,418,484 B2 | 8/2008 | Presley | |
| 7,478,263 B1 | 1/2009 | Kownacki et al. | |
| 7,502,329 B2 | 3/2009 | Li et al. | |
| 7,506,021 B2 | 3/2009 | Polan et al. | |
| 7,536,686 B2 | 5/2009 | Tan | |
| 7,624,133 B1 | 11/2009 | Ojalvo | |
| 7,680,771 B2 | 3/2010 | Cialini et al. | |
| 7,685,292 B1 | 3/2010 | Kinsella et al. | |
| 7,734,947 B1 | 6/2010 | Frangioso et al. | |
| 7,739,543 B1* | 6/2010 | Pittman ................ | G06F 11/006 714/6.32 |
| 7,769,721 B2 | 8/2010 | Jeoka et al. | |
| 7,801,932 B2 | 9/2010 | Krishnaswamy | |
| 7,877,783 B1 | 1/2011 | Cline et al. | |
| 7,966,528 B2 | 6/2011 | Troppmann et al. | |
| 7,971,094 B1 | 6/2011 | Benn et al. | |
| 7,991,749 B2 | 8/2011 | Nishikawa et al. | |
| 8,020,037 B1 | 9/2011 | Schwartz et al. | |
| 8,041,679 B1 | 10/2011 | Narayanan | |
| 8,074,107 B2 | 12/2011 | Sivasubramanian et al. | |
| 8,078,587 B2 | 12/2011 | Wahlert et al. | |
| 8,121,981 B2 | 2/2012 | Simek et al. | |
| 8,150,808 B2 | 4/2012 | Zha et al. | |
| 8,150,904 B2 | 4/2012 | Queck et al. | |
| 8,156,082 B2 | 4/2012 | Srivastava et al. | |
| 8,161,318 B2 | 4/2012 | D'Souza et al. | |
| 8,307,003 B1 | 11/2012 | Sheth et al. | |
| 8,352,608 B1 | 1/2013 | Keagy et al. | |
| 8,364,460 B2 | 1/2013 | Ostermeyer et al. | |
| 8,392,915 B2 | 3/2013 | Friedman et al. | |
| 8,595,547 B1 | 11/2013 | Sivasubramanian et al. | |
| 9,298,728 B2 | 3/2016 | McAlister et al. | |
| 9,806,978 B2 | 10/2017 | McAlister et al. | |
| 10,860,439 B2 | 12/2020 | McAlister et al. | |
| 2002/0019844 A1 | 2/2002 | Kurowski et al. | |
| 2002/0032883 A1 | 3/2002 | Kampe et al. | |
| 2002/0097672 A1 | 7/2002 | Barbas et al. | |
| 2002/0147709 A1 | 10/2002 | Rajarajan et al. | |
| 2003/0005091 A1 | 1/2003 | Ullmann et al. | |
| 2003/0158940 A1 | 8/2003 | Leigh | |
| 2003/0212775 A1 | 11/2003 | Steele et al. | |
| 2003/0212898 A1 | 11/2003 | Steele et al. | |
| 2004/0010487 A1 | 1/2004 | Prahlad et al. | |
| 2004/0073676 A1 | 4/2004 | Honma et al. | |
| 2004/0078637 A1 | 4/2004 | Fellin et al. | |
| 2004/0148443 A1 | 7/2004 | Achiwa | |
| 2004/0163008 A1 | 8/2004 | Kim | |
| 2004/0174823 A1 | 9/2004 | Steele et al. | |
| 2004/0225659 A1 | 11/2004 | O'Brien et al. | |
| 2004/0236983 A1 | 11/2004 | Burton et al. | |
| 2004/0260972 A1 | 12/2004 | Ji et al. | |
| 2004/0260976 A1 | 12/2004 | Ji et al. | |
| 2004/0260977 A1 | 12/2004 | Ji et al. | |
| 2004/0268177 A1 | 12/2004 | Ji et al. | |
| 2005/0004999 A1 | 1/2005 | Moore et al. | |
| 2005/0027845 A1 | 2/2005 | Secor et al. | |
| 2005/0038831 A1 | 2/2005 | Souder et al. | |
| 2005/0050392 A1 | 3/2005 | Baba et al. | |
| 2005/0114410 A1 | 5/2005 | Fujibayashi | |
| 2005/0193245 A1 | 9/2005 | Hayden et al. | |
| 2005/0198327 A1 | 9/2005 | Iwamura et al. | |
| 2005/0210128 A1 | 9/2005 | Cannon et al. | |
| 2005/0216788 A1 | 9/2005 | Mani-Meitav et al. | |
| 2005/0243611 A1 | 11/2005 | Lubbers et al. | |
| 2005/0262164 A1 | 11/2005 | Guiheneuf et al. | |
| 2005/0283655 A1 | 12/2005 | Ashmore | |
| 2006/0041641 A1 | 2/2006 | Breiter et al. | |
| 2006/0053251 A1 | 3/2006 | Nicholson et al. | |
| 2006/0104231 A1 | 5/2006 | Gidwani | |
| 2006/0106675 A1 | 5/2006 | Cohen et al. | |
| 2006/0106774 A1 | 5/2006 | Cohen et al. | |
| 2006/0136929 A1 | 6/2006 | Miller et al. | |
| 2007/0006015 A1 | 1/2007 | Rao et al. | |
| 2007/0022122 A1 | 1/2007 | Bahar et al. | |
| 2007/0061266 A1 | 3/2007 | Moore et al. | |
| 2007/0061487 A1 | 3/2007 | Moore et al. | |
| 2007/0083588 A1 | 4/2007 | Keller et al. | |
| 2007/0094467 A1 | 4/2007 | Yamasaki | |
| 2007/0156842 A1 | 7/2007 | Vermeulen et al. | |
| 2007/0156872 A1 | 7/2007 | Stoyanova | |
| 2007/0162420 A1 | 7/2007 | Ou et al. | |
| 2007/0174691 A1 | 7/2007 | D'Souza et al. | |
| 2007/0192329 A1 | 8/2007 | Croft et al. | |
| 2007/0196700 A1 | 8/2007 | Chen et al. | |
| 2007/0198700 A1 | 8/2007 | Vivian et al. | |

(56) References Cited

U.S. PATENT DOCUMENTS

| | | |
|---|---|---|
| 2007/0234028 A1 | 10/2007 | Rothman et al. |
| 2007/0234115 A1 | 10/2007 | Saika |
| 2007/0244996 A1 | 10/2007 | Ahmed et al. |
| 2007/0260693 A1 | 11/2007 | Cardone et al. |
| 2007/0260696 A1 | 11/2007 | Bohannon et al. |
| 2007/0260912 A1 | 11/2007 | Hatasaki et al. |
| 2007/0271275 A1 | 11/2007 | Fassette et al. |
| 2007/0283443 A1 | 12/2007 | McPherson et al. |
| 2007/0288481 A1 | 12/2007 | Shinn et al. |
| 2007/0288526 A1 | 12/2007 | Mankad et al. |
| 2007/0288799 A1 | 12/2007 | Iguchi et al. |
| 2007/0299828 A1 | 12/2007 | Lewis et al. |
| 2007/0299955 A1 | 12/2007 | Hoffman et al. |
| 2008/0010513 A1 | 1/2008 | Devarakonda et al. |
| 2008/0016293 A1 | 1/2008 | Saika |
| 2008/0040509 A1 | 2/2008 | Werb et al. |
| 2008/0052327 A1 | 2/2008 | Buah |
| 2008/0065650 A1 | 3/2008 | Kim et al. |
| 2008/0104443 A1 | 5/2008 | Akutsu et al. |
| 2008/0109448 A1 | 5/2008 | Aboel-Nil et al. |
| 2008/0126734 A1 | 5/2008 | Murase |
| 2008/0134176 A1 | 6/2008 | Fitzgerald et al. |
| 2008/0134178 A1 | 6/2008 | Fitzgerald et al. |
| 2008/0183991 A1 | 7/2008 | Cosmadopoulos et al. |
| 2008/0189413 A1 | 8/2008 | Srivastava et al. |
| 2008/0263388 A1 | 10/2008 | Allen et al. |
| 2008/0301663 A1 | 12/2008 | Bahat et al. |
| 2009/0006888 A1 | 1/2009 | Bernhard et al. |
| 2009/0019535 A1 | 1/2009 | Mishra et al. |
| 2009/0037425 A1 | 2/2009 | Erickson et al. |
| 2009/0106411 A1 | 4/2009 | Lisiecki et al. |
| 2009/0158081 A1* | 6/2009 | Dake ............... G06F 11/2028 714/E11.023 |
| 2009/0164853 A1 | 6/2009 | Gokhale et al. |
| 2009/0198940 A1 | 8/2009 | Ash et al. |
| 2009/0216881 A1 | 8/2009 | Ovy et al. |
| 2009/0271656 A1 | 10/2009 | Yokota et al. |
| 2009/0328065 A1 | 12/2009 | Wookey |
| 2010/0005531 A1 | 1/2010 | Largman et al. |
| 2010/0036851 A1 | 2/2010 | Paterson-Jones et al. |
| 2010/0077160 A1 | 3/2010 | Liu et al. |
| 2010/0169707 A1 | 7/2010 | Mathew et al. |
| 2010/0191713 A1 | 7/2010 | Lomet et al. |
| 2010/0211548 A1 | 8/2010 | Ott et al. |
| 2010/0250499 A1 | 9/2010 | McAlister et al. |
| 2010/0250748 A1 | 9/2010 | Sivasubramanian et al. |
| 2010/0251002 A1 | 9/2010 | Sivasubramanian et al. |
| 2010/0251242 A1 | 9/2010 | Sivasubramanian et al. |
| 2010/0251339 A1 | 9/2010 | McAlister |
| 2010/0262861 A1 | 10/2010 | Mazina |
| 2011/0004457 A1 | 1/2011 | Haviv et al. |
| 2011/0022883 A1 | 1/2011 | Hansen |
| 2011/0083138 A1 | 4/2011 | Sivasubramanian et al. |
| 2011/0099146 A1 | 4/2011 | McAlister et al. |
| 2011/0099147 A1 | 4/2011 | McAlister et al. |
| 2011/0099420 A1 | 4/2011 | MacDonald McAlister et al. |
| 2011/0178793 A1 | 7/2011 | Giffin et al. |
| 2011/0288847 A1 | 11/2011 | Narayanan et al. |

FOREIGN PATENT DOCUMENTS

| | | |
|---|---|---|
| CN | 101501688 | 8/2009 |
| CN | 101512507 | 8/2009 |
| CN | 101539841 | 9/2009 |
| FR | 2870020 | 11/2005 |
| JP | 2003330781 | 11/2003 |
| JP | 2004206696 | 7/2004 |
| JP | 2004-272884 | 9/2004 |
| JP | 2004362596 | 12/2004 |
| JP | 2005-339131 | 12/2005 |
| JP | 2006048670 | 2/2006 |
| JP | 2006065845 | 3/2006 |
| JP | 2007-115007 | 5/2007 |
| JP | 2007516510 | 6/2007 |
| JP | 2008009809 | 1/2008 |
| JP | 2009522659 | 6/2009 |
| JP | 2009-230742 | 10/2009 |
| JP | 2010-533911 | 10/2010 |
| WO | 2008014585 | 2/2008 |
| WO | 2009012296 | 1/2009 |
| WO | 2009036073 | 3/2009 |

OTHER PUBLICATIONS

Notice of Rejection mailed Sep. 10, 2013; in corresponding Japanese patent application No. 2012-536965.
International Search Report mailed on May 25, 2010 for International Application No. PCT/US10/029476 filed on Mar. 31, 2010, 2 pages.
International Search Report mailed on Dec. 2, 2010 for International Application No. PCT/US10/051757 filed on Oct. 7, 2010, 2 pages.
International Search Report mailed on Dec. 21, 2010 for International Application No. PCT/US10/54133 filed on Oct. 26, 2010, 2 pages.
International Search Report mailed on Dec. 21, 2010 for International Application No. PCT/US10/54141 filed on Oct. 26, 2010, 2 pages.
International Search Report mailed on Dec. 2, 2010 for International Application No. PCT/US10/54133 filed on Oct. 7, 2010, 2 pages.
Extended European Search Report for Application No. 10827394.7, Dated Oct. 13, 2015, Amazon Technologies, Inc., pp. 1-6.
Notice of Allowance and Fee(s) Due mailed Dec. 30, 2013; in corresponding U.S. Appl. No. 13/621,073.
Notice of Allowance and Fee(s) Due mailed Mar. 16, 2012; in corresponding U.S. Appl. No. 12/418,475.
Notice of Allowance and Fee(s) Due mailed Mar. 9, 2012; in corresponding U.S. Appl. No. 12/415,958.
Notice of Allowance and Fee(s) Due mailed Apr. 15, 2011; in corresponding U.S. Appl. No. 12/415,987.
Notice of Allowance and Fee(s) Due mailed Apr. 18, 2013; in corresponding U.S. Appl. No. 13/620,962.
Notice of Allowance and fee(s) Due mailed Jun. 1, 2012; in corresponding U.S. Appl. No. 12/415,968.
Amazon HQ Wiki, , "RDSMySQLConfigManagemenl/ConfigWorkflowDesign", RDS/EDS/DesignDocs/7RDSMySQLConfigManagemenl/ConfigWorkflowDesign from hllps://w.amazon.com/index.
Battles, Breit et al., "Reducing Data Center Power Consumption Through Efficient Storage", Google Scholar, <http://www.it-executive.nl/images/downloads/reducing-datacenter-power.pdf>, 2007, 9 pages.
Cordy, James R. , "Practical Language-Independent Detection of Near-Miss Clones", ACM, <http://delivery.acm.org/10.1145/1040000/1034915/p1-cordy.pdf>, 2001, 12 pages.
Ghemawat, Sanjay et al., "The Google File System", SOSP'03, Bolton Landing, New York., Oct. 19, 2003, 15 pages.
Lahiri, Tirthankar et al., "Cache Fusion: Extending Shared—Disk Clusters with Shared Caches", 27th VLDB Conference; Roma, Italy., 2001, 4 pages.
Lomet, David et al., "Recovery from "Bad" User Transactions", ACM, <http://delivery.acmorg/10.1145/1150000/1142512/p337-lomel.pdf>, 2006, 10 pages.
Lorentz, Diana et al., "Oracle 9i SQL", Release 2 (9.2), Oracle Corporation., 2002, 5 pages.
Mietzner, Ralph et al., "Towards Provisioning the Cloud: On the Usage of Multi-Granularity Flows and Services to Realize a Unified Provisioning Infrastructure for Saas Applications", 2008 IEEE Congress on Services, Part 1, 2008, 3-10.
Wang, Yi et al., "Virtual Routers on the Move: Live Router Migration as a Network- Management Primitive", ACM, <http://delivery.acm.org/10.1145/1410000/1402985/p231-wang.pdf>, 2008, 12 pages.
Amazon HQ Wiki, , "RDSMySQLConfigManagemenl/ConfigExecSummary", RDS/EDS/DesignDocs/RDSMySQLConfigManagemenl/ConfigExecSummary from hllps://w.amazon.com/index.php/RDS/EDS/ConfigExecSummary; downloaded Aug. 11, 2009, 2009.

(56) References Cited

OTHER PUBLICATIONS

Notice of Allowance and Fee(s) Due mailed Jun. 26, 2012; in corresponding U.S. Appl. No. 12/606,093.
Notice of Allowance mailed Jun. 28, 2012; in corresponding U.S. Appl. No. 12/418,475.
Notice of Allowance and Fee(s) Due mailed Jul. 12, 2011; in corresponding U.S. Appl. No. 12/606,097.
Notice of Allowance and Fee(s) Due mailed Jul. 5, 2012; in U.S. Appl. No. 12/415,958.
Notice of Allowance and Fee(s) Due mailed Jul. 9, 2013; in corresponding Japanese patent application No. 2012-533307.
Notice of Allowance and Fee(s) Due mailed Aug. 12, 2013; in corresponding U.S. Appl. No. 13/299,601.
Notice of Allowance and Fee(s) Due mailed Aug. 26, 2013; in corresponding U.S. Appl. No. 13/620,962.
Notice of Allowance and Fee(s) Due mailed Aug. 8, 2011; in corresponding U.S. Appl. No. 12/415,987.
Office Action mailed Oct. 3, 2013; in corresponding Canadian patent application No. 2,755,913.
Supplemental Notice of Allowance and Fee(s) Due mailed Oct. 25, 2013; in corresponding U.S. Appl. No. 13/294,099.
Written Opinion mailed Oct. 2, 2012; in corresponding Singapore patent application No. 201202967-4.
Written Opinion mailed Feb. 15, 2012; in corresponding Singapore patent application No. 201107040-6.
International Search Report mailed Dec. 23, 2010; in corresponding PCT patent application No. PCT/US10/54133.
Non-Final Office Action mailed Apr. 9, 2014; in corresponding U.S. Appl. No. 12/416,017.
Non-Final Office Action mailed May 7, 2014; in corresponding U.S. Appl. No. 13/621,044.
English translation of The First Office Action mailed Jun. 26, 2014; in corresponding Chinese patent application No. 201080056327.0.
The First Office Action mailed Jun. 26, 2014; in corresponding Chinese patent application No. 201080056327.0.
Final Office Action mailed Jul. 22, 2014; in corresponding U.S. Appl. No. 12/415,998.
IBM Redbook, SAN vol. Controller: Best Practices and Performance Guidelines ; Jul. 2007.
Unix/Linux Administration Logical Volume Management Guide; 2005.
IBM Redbook; z/NM and Linux on IBM System z the Virtualization Cookbook for Red hat Enterprise Linux 5.2.; Oct. 2008.
Non-Final Office Action mailed Jul. 30, 2014; in corresponding U.S. Appl. No. 12/575,381.
Office Action mailed Apr. 14, 2014; in corresponding Canadian patent application No. 2,776,384.
Examination Report mailed Oct. 19, 013; in corresponding Singapore patent application No. 01202870-0.
English translation for the Notice of Rejection mailed Sep. 10, 2013; in corresponding Japanese patent application No. 2012-536965.
Examination Report mailed Sep. 6, 2013; in corresponding Canadian patent application No. 2,778,456.
Notice of Allowance and Fee(s) Due mailed Dec. 30, 2013; in corresponding U.S. Appl. No. 13/620,999.
Examination Report mailed Oct. 29, 2012; in corresponding Singapore Patent Application No. 201202868-4.
Examination Report mailed Oct. 30, 012; in corresponding Singapore Patent Application No. 201107040-6.
Examination Report mailed Dec. 11, 2012 in corresponding Singapore Patent Application No. 201202502-9.
Examination Report Mailed May 17, 2013 in corresponding Singapore Patent Application No. 201202967-4.
Examination Report mailed Sep. 13, 2013; in corresponding Singapore Patent Application No. 201202868-4.
Extended European Search Report mailed Sep. 19, 2013; in corresponding European Patent Application No. 10827392.1.
Final Office Action mailed Oct. 14, 2011; in corresponding U.S. Appl. No. 12/415,958.

Final Office Action mailed Oct. 16, 2012; in corresponding U.S. Appl. No. 12/575,381.
Final Office Action mailed Oct. 19, 2011; in corresponding U.S. Appl. No. 12/418,475.
Final Office Action mailed Nov. 1, 2012; in corresponding U.S. Appl. No. 12/606,106.
Final Office Action mailed Dec. 19, 2011; in corresponding U.S. Appl. No. 12/415,968.
Final Office Action mailed Feb. 22, 2013; in corresponding U.S. Appl. No. 13/294,099.
Final Office Action mailed Mar. 22, 2011; in corresponding U.S. Appl. No. 12/415,998.
Final Office Action mailed May 8, 2013; in corresponding U.S. Appl. No. 12/416,017.
Non Final Office Action mailed Jan. 2, 2013; in corresponding U.S. Appl. No. 13/620,962.
Non Final Office Action mailed Jan. 31, 2014; in corresponding U.S. Appl. No. 12/415,998.
Non Final Office Action mailed Oct. 14, 2010; in corresponding U.S. Appl. No. 12/415,998.
Non-Final Office Action mailed Dec. 14, 2010; in corresponding U.S. Appl. No. 12/415,987.
Non Final Office Action mailed Feb. 14, 2011; in corresponding U.S. Appl. No. 12/606,097.
Non Final Office Action mailed Mar. 14, 2012; in corresponding U.S. Appl. No. 12/606,093.
Non Final Office Action mailed Mar. 18, 2013; in corresponding U.S. Appl. No. 13/299,601.
Non Final Office Action mailed Apr. 18, 2012; in corresponding U.S. Appl. No. 12/575,381.
Non Final Office Action mailed Apr. 29, 2011; in corresponding U.S. Appl. No. 12/415,968.
Non Final Office Action mailed May 2, 2011; in corresponding U.S. Appl. No. 12/418,475.
Non Final Office Action mailed May 2, 2011; in corresponding U.S. Appl. No. 12/415,958.
Non Final Office Action mailed May 28, 2013; in corresponding U.S. Appl. No. 12/606,106.
Non-Final Office Action mailed May 31, 2012; in corresponding U.S. Appl. No. 12/606,106.
Non Final Office Action mailed Jun. 20, 2013; in corresponding U.S. Appl. No. 13/620,999.
Non Final Office Action mailed Jun. 20, 2013; in corresponding U.S. Appl. No. 13/621,073.
Non Final Office Action mailed Jul. 23, 2013; in corresponding Japanese patent application No. 2012-536964.
Non Final Office Action mailed Jul. 23, 2013; in corresponding Japanese patent application No. 2012-536966.
Non Final Office Action mailed Aug. 19, 2011; in corresponding U.S. Appl. No. 12/416,017.
Notice of Allowance and Fee(s) Due mailed Nov. 13, 2013; in corresponding U.S. Appl. No. 12/606,106.
Non Final Office Action mailed Sep. 13, 2012; in corresponding U.S. Appl. No. 13/294,099.
Non Final Office Action mailed Sep. 14, 2012; in corresponding U.S. Appl. No. 13/299,601.
Notice of Allowance and Fee(s) Due mailed Oct. 24, 2012; in corresponding U.S. Appl. No. 12/606,093.
Notice of Allowance and Fee(s) Due mailed Nov. 13, 2012; in corresponding U.S. Appl. No. 12/415,968.
Notice of Allowance and Fee(s) Due mailed Dec. 26, 2013; in corresponding U.S. Appl. No. 12/415,958.
Office Action from Japanese Patent Application No. 2015/247729, Dated Feb. 21, 2017 (English Translation and Japanese version), pp. 1-9.
Extended European Search Report from Application No. 17186495.2, dated Dec. 22, 2017, Amazon Technologies, Inc., pp. 1-7.
Office Action from India Application No. 997/KOLNP/2012, Dated Jul. 20, 2018, pp. 1-6.

* cited by examiner

FAILOVER AND RECOVERY FOR REPLICATED DATA INSTANCES

CROSS-REFERENCE TO RELATED APPLICATIONS

This application is a continuation of U.S. patent application Ser. No. 17/112,731, Filed Dec. 4, 2020, which is a continuation of U.S. patent application Ser. No. 15/811,565, filed Nov. 13, 2017, now U.S. Pat. No. 10,860,439, which is a continuation of U.S. patent application Ser. No. 15/083,210, filed Mar. 28, 2016, now U.S. Pat. No. 9,817,727, which is a continuation of U.S. patent application Ser. No. 14/089,616, filed Nov. 25, 2013, now U.S. Pat. No. 9,298,728, which is a continuation of U.S. patent application Ser. No. 13/299,601, filed Nov. 18, 2011, now U.S. Pat. No. 8,595,547, which is a continuation of U.S. patent application Ser. No. 12/606,097, filed Oct. 26, 2009, now U.S. Pat. No. 8,074,107, which are hereby incorporated by reference herein their entirety.

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

While aspects of various applications and resources can be adjusted and managed in the cloud, the data repositories upon which these applications and resources rely are not similarly adjustable or easily managed by a customer or other such user. Typically, performing tasks such as provisioning and scaling data storage are tedious manual procedures, in which a customer has to provide a database administrator (DBA) or similar expert user with configuration information and requirements, such that the DBA can determine whether the configuration is valid. Further, there is no easy way for a customer to dynamically and/or automatically adjust the parameters for a database instance or manage other such aspects of a data repository. In many cases, a data instance will have backup and recovery mechanisms in place, but these mechanisms often are in a single location or area such that they are susceptible to failure or outages in that area. Further, when a data instance fails, it typically takes a few minutes to generate a new instance, attach the appropriate volumes to the new instance, and otherwise perform tasks necessary to recover from the failure.

BRIEF DESCRIPTION OF THE DRAWINGS

Various embodiments in accordance with the present disclosure will be described with reference to the drawings, in which.

DETAILED DESCRIPTION

Figure 1:
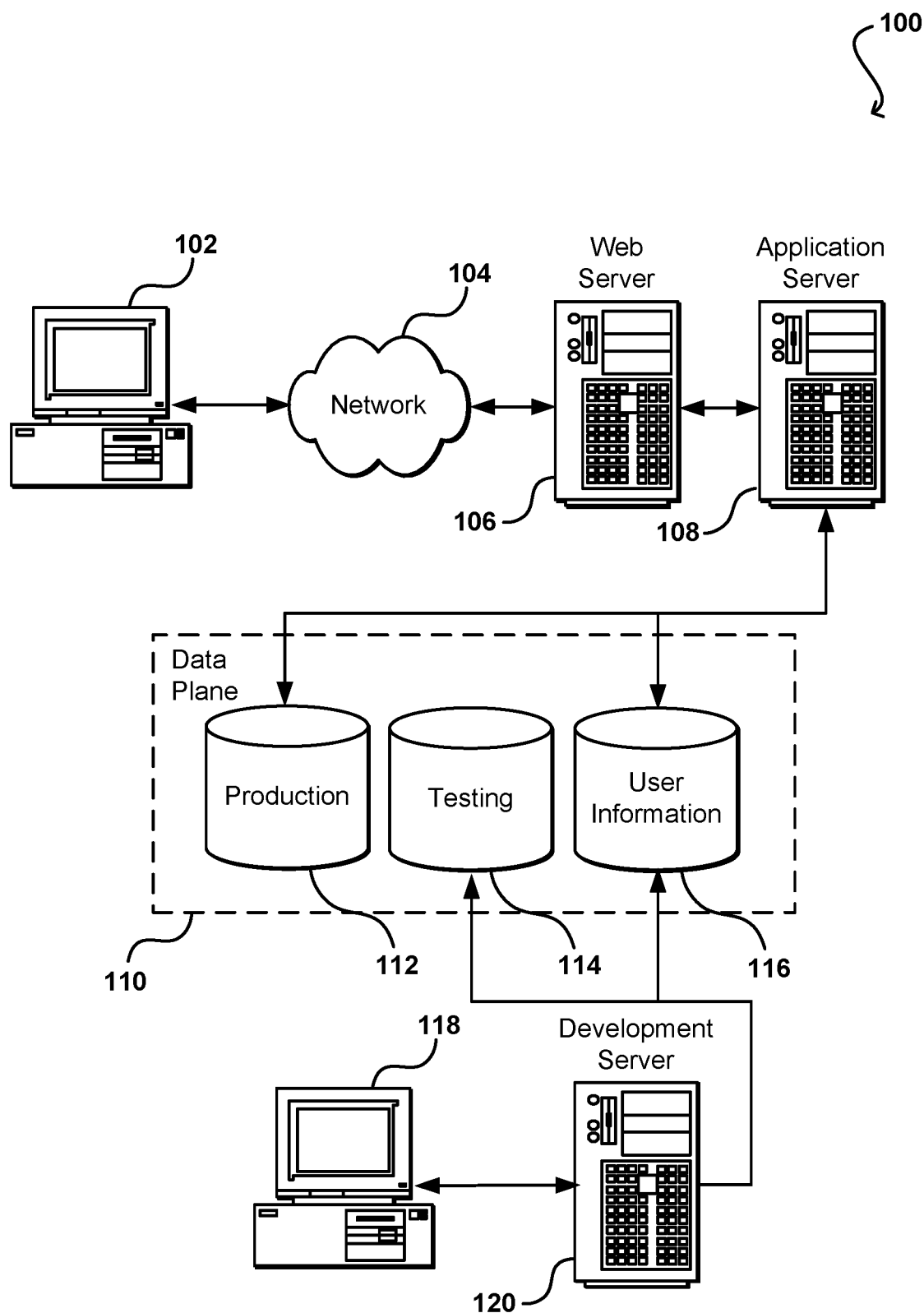
FIG. 1 illustrates an environment in which various embodiments can be implemented.

Systems and methods in accordance with various embodiments of the present disclosure may overcome one or more of the aforementioned and other deficiencies experienced in conventional approaches to managing aspects of data storage in an electronic environment. In particular, various embodiments provide a separate control environment, or control plane, that can be used to enable a user to manage and/or alter various aspects of a data environment, or data plane. This "self-service" functionality can be provided via a set of Web services, enabling the user and control plane to act together as a virtual database administrator (DBA). A user or customer can submit a request to the control plane through one of a plurality of externally-visible application programming interfaces (APIs), for example. Various APIs can be used to perform specific functions with respect to a data repository, such as a relational database, in the data environment. A request received to one of the APIs can be analyzed to determine the desired action(s) to be performed in the data plane, such as actions that adjust operational or configuration parameters of a data store or data storage instance. A component such as a workflow component can determine the appropriate tasks for the action, and cause the tasks to be executed in an appropriate order. At least one of these tasks typically will be performed in the data environment, such as to adjust an aspect of a relational database.

In accordance with certain embodiments, such a system can provide for the provisioning of a replicated data instance in the data environment. The provisioning can utilize a primary-secondary replication approach, with each of the primary and secondary replicas being provisioned in or across one or more separate data zones, separate geographic locations, etc. The database replicas can run on separate data instances, each attached to dedicated block storage volumes that are not shared across the replicas.

In various embodiments, replication can be performed using a block-level replication mechanism, such as a Distributed Replicated Block Device (DRBD®) from Linbit of Vienna, Austria, or an Elastic Block Store (EBS), as provided by Amazon.com, Inc., of Seattle, Washington, which can mirror the content of block devices between servers and synchronously replicate data across redundant systems. Each instance can run a kernel that has a block-level replication mechanism (BLRM) kernel module installed for managing all input and output (I/O) operations for the data instance. All reads and writes can be executed at a primary replica, with the block-level replication mechanism replicating the information synchronously with the secondary replica.

Both the primary and secondary replicas can have an external facing DNS name. Customers can reach the current primary replica using a DNS name such as DNS_primary. The DNS_primary name can alias or "cname" to the external DNS name of the (current) primary replica. When a primary replica fails or is otherwise unavailable, the secondary replica can be promoted or failed over to become the new primary replica, whereby the cname for DNS_primary can update to the DNS name of the new primary instance. All writes are sent to the database on the current primary replica. When the primary instance receives a write, the information is synchronously written to the secondary replica. Upon successful write at both places, the write can be deemed successful. All reads also are executed only at the primary replica in various embodiments.

Database replication thus can be supported across multiple data instances using instance replicas running in different data zones. Database writes can be committed using a synchronous replication mechanism at the block level, such that no data is lost unless all the replicas are unavailable due to a large scale outage involving multiple data zones, etc. Replication can provide higher availability than can be accomplished using a single database instance, as a single replica failure does not cause an outage to the database for an extended period of time. For instance, if the primary replica of a database is down, various embodiments can perform a failover operation whereby a secondary replica takes over as the new primary replica. Replication also can provide higher durability than a non-replicated database in many instances, protecting against failure of an data zone, data volume failure, etc.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for a provider such as an electronic marketplace, wherein multiple hosts might be used to perform tasks such as serving content, authenticating users, performing payment transactions, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2, discussed in detail below.

Systems and methods in accordance with one embodiment provide a relational database service ("RDS") that enables developers, customers, or other authorized users to easily and cost-effectively obtain and configure relational databases and other such data sources so that users can perform tasks such as storing, processing, and querying relational data sets in a cloud. While this example is discussed with respect to the Internet, Web services, and Internet-based technology, it should be understood that aspects of the various embodiments can be used with any appropriate services available or offered over a network in an electronic environment. Further, while the service is referred to herein as a "relational database service," it should be understood that such a service can be used with any appropriate type of data repository or data storage in an electronic environment. An RDS in this example includes at least one Web service that enables users or customers to easily manage relational data sets without worrying about the administrative complexities of deployment, upgrades, patch management, backups, replication, failover, capacity management, scaling, and other such aspects of data management. Developers are thus freed to develop sophisticated cloud applications without worrying about the complexities of managing the database infrastructure.

An RDS in one embodiment provides a separate "control plane" that includes components (e.g., hardware and software) useful for managing aspects of the data storage. In one embodiment, a set of data management application programming interfaces (APIs) or other such interfaces are provided that allow a user or customer to make calls into the RDS to perform certain tasks relating to the data storage. The user still can use the direct interfaces or APIs to communicate with the data repositories, however, and can use the RDS-specific APIs of the control plane only when necessary to manage the data storage or perform a similar task.

Figure 2:
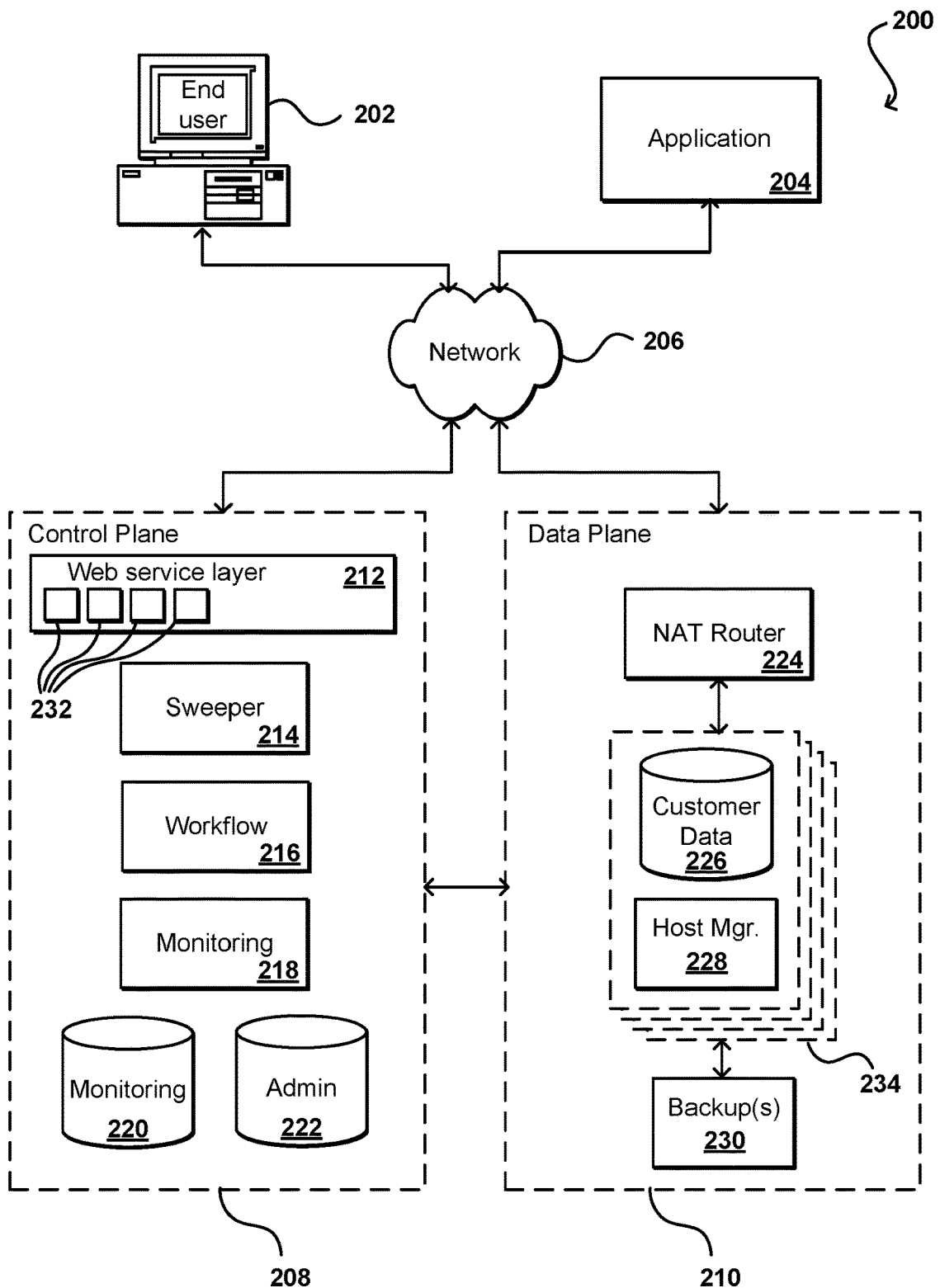
FIG. 2 illustrates an example separation of a control plane and a data plane that can be used in accordance with various embodiments.

FIG. 2 illustrates an example of an RDS implementation 200 that can be used in accordance with one embodiment. In this example, a computing device 202 for an end user is shown to be able to make calls through a network 206 into a control plane 208 to perform a task such as to provision a data repository of the data plane 210. The user or an application 204 can access the provisioned repository directly through an interface of a data plane 210. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation of at least some resources (e.g., hardware and/or software) used to provide the respective functionality.

The control plane 208 in this example is essentially a virtual layer of hardware and software components that handles control and management actions, such as provisioning, scaling, replication, etc. The control plane in this embodiment includes a Web services layer 212, or tier, which can include at least one Web server, for example, along with computer-executable software, application servers, or other such components. The Web services layer also can include a set of APIs 232 (or other such interfaces) for receiving Web services calls or requests from across the network 206. Each API can be provided to receive requests for at least one specific action to be performed with respect to the data environment, such as to provision, scale, clone, or hibernate an instance of a relational database. Upon receiving a request to one of the APIs, the Web services layer can parse or otherwise analyze the request to determine the steps or actions needed to act on or process the call. For example, a Web service call might be received that includes a request to create a data repository. In this example, the Web services layer can parse the request to determine the type of data repository to be created, the storage volume requested, the type of hardware requested (if any), or other such aspects. Information for the request can be written to an administration ("Admin") data store 222, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a geographical region, or near a geographical location, for example, such that the servers are resilient to single data center failures.

The control plane in this embodiment includes what is referred to herein as a "sweeper" component 214. A sweeper component can be any appropriate component operable to poll various components of the control plane or otherwise determine any tasks to be executed in response to an outstanding request. In this example, the Web services layer might place instructions or information for the "create database" request in the admin data store 222, or a similar job queue, and the sweeper can periodically check the admin data store for outstanding jobs. Various other approaches can be used as would be apparent to one of ordinary skill in the art, such as the Web services layer sending a notification to a sweeper that a job exists. The sweeper component can pick up the "create database" request, and using information for the request can send a request, call, or other such command to a workflow component 216 operable to instantiate at least one workflow for the request. The workflow in one embodiment is generated and maintained using a workflow service as is discussed elsewhere herein. A workflow in general is a sequence of tasks that should be executed to perform a specific job. The workflow is not the actual work, but an abstraction of the work that controls the flow of information and execution of the work. A workflow also can be thought of as a state machine, which can manage and return the state of a process at any time during execution. A workflow component (or system of components) in one embodiment is operable to manage and/or perform the hosting and executing of workflows for tasks such as: repository creation, modification, and deletion; recovery and backup; security group creation, deletion, and modification; user credentials management; and key rotation and credential management. Such workflows can be implemented on top of a workflow service, as discussed elsewhere herein. The workflow component also can manage differences between workflow steps used for different database engines, such as MySQL, as the underlying workflow service does not necessarily change.

In this example, a workflow can be instantiated using a workflow template for creating a database and applying information extracted from the original request. For example, if the request is for a MySQL® Relational Database Management System (RDBMS) instance, as opposed to an Oracle® RDBMS or other such instance, then a specific task will be added to the workflow that is directed toward MySQL instances. The workflow component also can select specific tasks related to the amount of storage requested, any specific hardware requirements, or other such tasks. These tasks can be added to the workflow in an order of execution useful for the overall job. While some tasks can be performed in parallel, other tasks rely on previous tasks to be completed first. The workflow component or service can include this information in the workflow, and the tasks can be executed and information passed as needed.

An example "create database" workflow for a customer might includes tasks such as provisioning a data store instance, allocating a volume of off-instance persistent storage, attaching the persistent storage volume to the data store instance, then allocating and attaching a DNS address or other address, port, interface, or identifier which the customer can use to access or otherwise connect to the data instance. In this example, a user is provided with the DNS address and a port address to be used to access the instance. The workflow also can include tasks to download and install any binaries or other information used for the specific data storage technology (e.g., MySQL). The workflow component can manage the execution of these and any related tasks, or any other appropriate combination of such tasks, and can generate a response to the request indicating the creation of a "database" in response to the "create database" request, which actually corresponds to a data store instance in the data plane 210, and provide the DNS address to be used to access the instance. A user then can access the data store instance directly using the DNS address and port, without having to access or go through the control plane 208. Various other workflow templates can be used to perform similar jobs, such as deleting, creating, or modifying one of more data store instances, such as to increase storage. In some embodiments, the workflow information is written to storage, and at least one separate execution component (not shown) pulls or otherwise accesses or receives tasks to be executed based upon the workflow information. For example, there might be a dedicated provisioning component that executes provisioning tasks, and this component might not be called by the workflow component, but can monitor a task queue or can receive information for a provisioning task in any of a number of related ways as should be apparent.

As mentioned, various embodiments can take advantage of a workflow service that can receive requests or calls for a current state of a process or task, such as the provisioning of a repository, and can return the current state of the process. The workflow component and/or workflow service do not make the actual calls or requests to perform each task, but instead manage the state and configuration information for the workflow that enables the components of the control plane to determine the next task to be performed, and any information needed for that task, then generate the appropriate call(s) into the data plane including that state information, whereby a component of the data plane can make the call to perform the task. Workflows and tasks can be scheduled in parallel in order to increase throughput and maximize processing resources. As discussed, the actual performing of the tasks will occur in the data plane, but the tasks will originate from the control plane. For example, the workflow component can communicate with a host manager, which can make calls into the data store. Thus, for a given task a call could be made to the workflow service passing certain parameters, whereby the workflow service generates the sequence of tasks for the workflow and provides the current state, such that a task for the present state can be performed. After the task is performed (or otherwise resolved or concluded), a component such as the host manager can reply to the service, which can then provide information about the next state in the workflow, such that the next task can be performed. Each time one of the tasks for the workflow is performed, the service can provide a new task to be performed until the workflow is completed.

Further, multiple threads can be running in parallel for different workflows to accelerate the processing of the workflow.

The control plane 208 in this embodiment also includes at least one monitoring component 218. When a data instance is created in the data plane, information for the instance can be written to a data store in the control plane, such as a monitoring data store 220. It should be understood that the monitoring data store can be a separate data store, or can be a portion of another data store such as a distinct set of tables in an Admin data store 222, or other appropriate repository. A monitoring component can access the information in the monitoring data store to determine active instances 234 in the data plane 210. A monitoring component also can perform other tasks, such as collecting log and/or event information from multiple components of the control plane and/or data plane, such as the Web service layer, workflow component, sweeper component, and various host managers. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each instance 234 in the data plane can include at least one data store 226 and a host manager component 228 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager also perform and/or mange the installation of software patches and upgrades for the data store and/or operating system. A host manger also can collect relevant metrics, such as may relate to CPU, memory, and I/O usage.

The monitoring component can communicate periodically with each host manager 228 for monitored instances 234, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. If a response is not received after a specified number of retries, then the monitoring component can determine that there is a problem and can store information in the Admin data store 222 or another such job queue to perform an action for the instance, such as to verify the problem and re-provision the instance if necessary. The sweeper can access this information and kick off a recovery workflow for the instance to attempt to automatically recover from the failure. The host manager 228 can act as a proxy for the monitoring and other components of the control plane, performing tasks for the instances on behalf of the control plane components. Occasionally, a problem will occur with one of the instances, such as the corresponding host, instance, or volume crashing, rebooting, restarting, etc., which cannot be solved automatically. In one embodiment, there is a logging component (not shown) that can log these and other customer visibility events. The logging component can include an API or other such interface such that if an instance is unavailable for a period of time, a customer can call an appropriate "events" or similar API to get the information regarding the event. In some cases, a request may be left pending when an instance fails. Since the control plane in this embodiment is separate from the data plane, the control plane never receives the data request and thus cannot queue the request for subsequent submission (although in some embodiments this information could be forwarded to the control plane). Thus, the control plane in this embodiment provides information to the user regarding the failure so the user can handle the request as necessary.

As discussed, once an instance is provisioned and a user is provided with a DNS address or other address or location, the user can send requests "directly" to the data plane 210 through the network using a Java Database Connectivity (JDBC) or other such client to directly interact with that instance 234. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 202 or application 204, for example, can be directed to a network address translation (NAT) router 224, or other appropriate component, which can direct the request to the actual instance 234 or host corresponding to the DNS of the request. As discussed, such an approach allows for instances to be dynamically moved, updated, replicated, etc., without requiring the user or application to change the DNS or other address used to access the instance. As discussed, each instance 234 can include a host manager 228 and a data store 226, and can have at least one backup instance or copy in persistent storage 230. Using such an approach, once the instance has been configured through the control plane, a user, application, service, or component can interact with the instance directly through requests to the data plane, without having to access the control plane 232. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 208 can be offered as at least one service by a provider that may or may not be related to a provider of the data plane 210, but may simply be a third-party service that can be used to provision and manage data instances in the data plane, and can also monitor and ensure availability of those instances in a separate data plane 210.

As discussed, one advantage to providing the functionality of a control plane as a Web service or other such service is that the control plane functions as a virtual database administrator (DBA) and avoids the need for a human DBA to perform tasks such as provisioning data. Provisioning data is presently a tedious manual procedure, requiring a DBA to receive the necessary configuration information, determine whether the configuration is valid, optimize and tune the instance, and perform other such tasks, which take a significant amount of time and effort. Further, such an approach provides many opportunities for error, which might not be discovered until after data is lost. Using a control plane or service as described herein, a user or customer can instead submit a call including information such as a type of hardware and a version of a database product. The control plane or service can then perform the necessary tasks to create, delete, modify, expand, or otherwise modify a data store or data storage instance. The control plane also can support several different database engines in a consistent fashion, without requiring a DBA to be an expert in each of the engines. Once provisioned, the user has native access to the data instance(s), and can simply point existing applications (such as MySQL applications) to the DNS address or other location information for the particular instance. There is no restriction or modification of query models or other such functionality, as a user can continue to use applications built on MySQL, Oracle, or other database technology.

Figure 3:
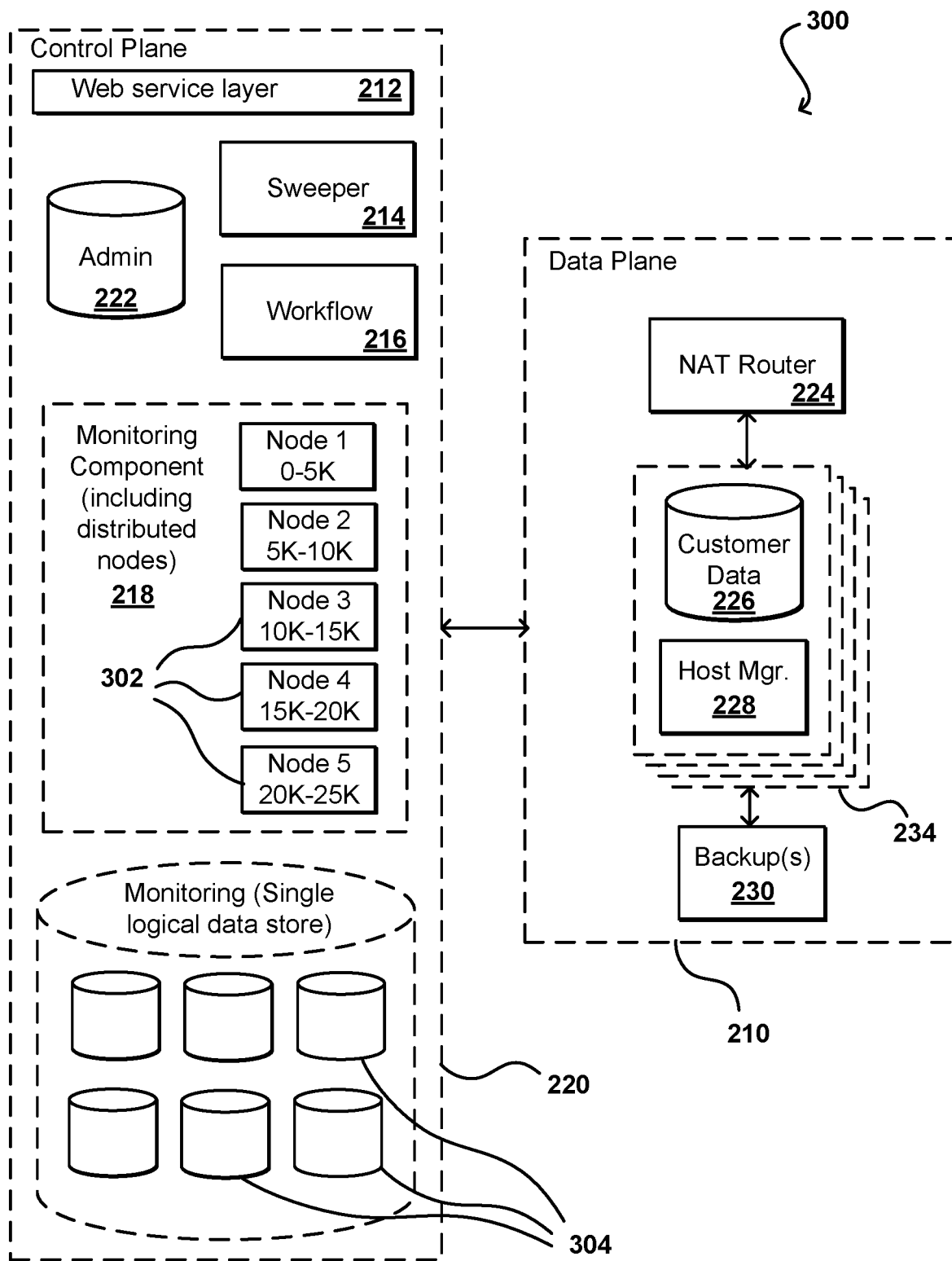
FIG. 3 illustrates an example utilizing a plurality of monitoring components that can be used in accordance with various embodiments.

FIG. 3 illustrates an example of a configuration 300 that can be used for purposes such as monitoring and automated recovery of RDS instances, either single or replicated, in accordance with one embodiment. Although reference numbers are carried over between figures for purposes of simplicity and clarity, it should be understood that these merely represent similar components that can be used for various embodiments, and should not be interpreted as requiring components from various other embodiments or as merely showing different views of a single embodiment. Further, fewer or additional components can be used in various embodiments, and the presence or lack of a component in a given figure should not be interpreted as that component being required or not useful in a given embodiment unless otherwise specifically stated. Variations between the embodiments and figures should be apparent to one of ordinary skill in light of the present disclosure.

As illustrated in the figure, a monitoring component (or service) 218 of the control plane can comprise a series of processing nodes 302, referred to herein as event processors. In one embodiment, the event processors comprise a fleet of monitoring servers operable to monitor aspects of the data plane. Each event processor can be configured to communicate with a specified set or range of data stores 226 and/or data instances 234 through the associated host manager 228. As discussed, each data store and host manager can exist on a node or machine of the data plane 210, or data environment. Each of the event processors can communicate with the allocated host managers using any appropriate communication technique to obtain a current status from each host, such as by pinging each host manager using a secure (e.g., HTTPS) request, such as a "getStatus" request. In response to the request, each host manager can send a response including information such as whether there is a problem with, or detected by, the host manager 228, as well as any relevant metrics, parameter values, or diagnostic information that is determined to be relevant. In certain embodiments, the amount and type of information returned by a host manager can vary based upon a state of the host manager. For example, if there are no errors detected then the host manager might send a standard set of specified metrics to be logged or otherwise processed. If a problem is detected, for example, then a different set of information might be included, such as information indicating the type of problem as well as diagnostic or other information relevant to that type of problem. Various algorithms can be provided to the host managers for making such determinations. Upon receiving the information from the host managers, the event processors can analyze the information, as necessary, and store the information in a monitoring data store 220 or other such location. The event processors can also store any log information, discussed elsewhere herein, in the monitoring data store. As illustrated in this example, the monitoring data store 220 can be a single logical data store, but can be partitioned across many data instances 304.

There can be many advantages to using multiple event processors 302 as part of the monitoring component 218. One such advantage is that, for a large number of data instances 234 in the data plane, a single event processor may not have enough capacity to monitor each instance concurrently. Utilizing multiple event processors allows the monitoring work to the distributed across several event processors. Further, using multiple event processors allows for existing event processors to take on the work of another event processor in the event of a failure or other such problem. If a data instance was only managed by a single event processor, and there was a problem with that processor making the event processor unavailable, then that data instance might not have any monitoring performed and thus could risk an outage or other such problem. By spreading the monitoring across a set of event processors, and allowing the range of monitoring by each event processor to update dynamically, the control plane can ensure that each instance in the data plane is monitored at substantially any time, even in the event of a failure of one or more of the event processors.

In one embodiment, the responsibility of each event processor is determined by taking the number of instances (including replicas) to be monitored at any given time and apportioning the number of instances across the number of event processors. For example, if there are 25,000 instances to be monitored in the data plane, and there are five event processors running in the control plane, then each event processor can be given responsibility for monitoring approximately 5,000 of the data instances. If each instance is given an identifier, for example, then each event processor can be given a range of identifiers (such as the first 5,000 identifiers, second 5,000 identifiers, etc.) to make it easier to adjust responsibility for each event processor, rather than having to manage mapping information for each of the 25,000 instances. The example in the figure shows the range of responsibilities for each of the event processors in such an example.

At an appropriate interval, such as once a minute, each event processor 302 can send a request to each host manager 228 being monitored by that event processor. An event processor in one embodiment is a Java application running within a Tomcat container of the control plane that regularly polls the host managers for data instances in the data plane. The event processor can poll a host manager in one embodiment by making a getStatus( ) or similar call (e.g., over SSL) using the DNS name and host manager port. In some embodiments a data instance being monitored is uniquely identified by a combination of a customer data store identifier, a data store identifier, and an instance identifier. Using such an approach, the states of the old and new instances can be distinguished when moving a data instance to another instance in the cloud. The event processor can determine the state of the data instance based upon the response from of the host manager. A data instance in one embodiment can be in one of at least the following example states: "OK" (the data instance is running properly), "incommunicado" (the data instance is in a suspect state of failure), or "dead" (the data instance is unreachable and does not respond to requests for status).

In most cases, the host manager will return a response indicating that the host manger, associated instance, etc., is running as expected, and the event processor can update information in the monitoring data store 220. An event processor can consider a data instance to be in an "OK" or similar state in one embodiment when the host manager returns an appropriate response, such as an HTTP response code "200" (a standard response code for successful HTTP requests). If a response is not received from a host manager, or if the response is a timed-out response (such as HTTP code "500", or any other "5xx" error response codes), the event processor can resend the getStatus request, and can place the database instance in an "incommunicado" or similar state. If the host has been in the "incommunicado" state for more than a predetermined number of status pings, or other such requests, then the data instance can be declared to be in a "dead" or similar state. If the host comes back online with a "200" response (or similar) code within the predetermined number of status pings, the host or instance can be moved to an "OK" state. The predetermined number of checks before moving a host state from "incommunicado" to "dead" or "OK" used, at least in part, is to avoid false positives due to intermittent network errors, temporarily overloaded event processors, temporarily overloaded host managers, or other such temporary errors that do not actually result in a data instance being unavailable other otherwise requiring recovery. In one embodiment, a state of "incommunicado" is not persisted, as the state can easily be determined by another event processor.

If a reply is not received after the predetermined number of status requests, or the state is otherwise moved to a "dead" or similar state, as discussed elsewhere herein, the event processor enters information regarding the problem state into the Admin data store 222 (or other such job queue as discussed above) indicating that there is a suspect state with respect to the unresponsive host manager. As discussed above, a sweeper 214 component of the control plane can periodically check the Admin data store for information, and when the sweeper detects the information for the suspect or problem state, an appropriate recovery workflow can be started. For example, the sweeper can pass information to the workflow component 216 that causes an appropriate workflow to be generated, such as a workflow to handle a data instance being unavailable, a workflow to handle errors reported by a host manager, or any of a number of other such situations. The workflow manager can generate the appropriate workflow, pass state information, and handle various other aspects as discussed elsewhere herein.

One advantage to storing recovery information in the Admin data store is that such an approach allows for recovery even in the event of a failure of the monitoring system. It can be desirable to enable recovery actions independent of the availability of the monitoring data store. It can be acceptable to use the Admin data store, as in this embodiment any type of recovery, including generating a workflow, etc., requires the Admin data store (or other such job queue) to be active and available. It can thus be desirable to avoid placing another dependency on the recovery, and instead having a single place of availability.

Systems and methods in accordance with various embodiments enable customers to utilize Web services, or a similar such approach, to create one or more replicated database instances in a cloud computing or similar environment, providing a highly durable and highly available data solution. When a customer creates a replicated database instance in various embodiments, the customer data is synchronously replicated using a primary-secondary replication model. In some embodiments, the replicas can be located in different physical locations, such as in different data zones. Each data "zone" can refer to one or more data centers, or groups of data servers, for example, located within a specific geographical area, with different zones being located at or around different geographic locations. An RDS instance then can tolerate the failure of one of the data zones, as another data zone at a different geographic location can likely avoid the failure, except in the case of a large catastrophic event. In some cases a data center can span multiple data zones, but data replicas within a given data center can be instantiated in different zones. Many other variations are possible, such as overlapping zones, zones at multiple geographic locations, etc. If a primary replica fails or otherwise becomes unavailable, the RDS system can quickly and automatically failover to the secondary replica, resulting in very little downtime or data unavailability.

In one embodiment, a customer is able to create a replicated database instance by calling a specified interface of the Web services layer of the control plane, such as is discussed with respect to FIG. 2. For example, a customer can call a "CreateDBInstance" API specifying aspects such as the instance class, allocated storage, database engine, etc., as the customer would to create a non-replicated data instance. When creating a replicated instance, the customer can include at least one additional parameter, such as a "Replicated" or similar parameter, with a value set to "true" or any other appropriate value indicating that the created instance should be replicated. In some embodiments, the value is set to "false" by default such that non-replicated instances are created unless otherwise specified by the customer. In some embodiments, only certain customers have the ability to create replicated instances, such as a customer who pays for a certain level of service, etc.

In some embodiments, a customer also can select whether the secondary replica is created in a different data zone than the primary replica. The customer in some embodiments also can be allowed to select one or more specific data zones for the instances, or an ordered list, for example, while in other embodiments customers are not able to select the data zone for at least the primary replica. If a customer specifies two data zones and one of the data zones becomes unavailable for an extended period of time, for example, the durability requirements in some embodiments would cause another replica to be generated in a third data zone, and so on. This could require management and updating of orders data zone lists for multiple customers, which can complicate the user experience without providing any significant benefit. Further, it can be easier for applications to spread the associated application fleet across data zones, such that there can be some application fleets located in the same data zone as the secondary replica.

In some embodiments, a customer can call a "DescribeDBInstance" or similar API for the replicated data instance, whereby RDS can list information such as the endpoint DNS name of the primary replica and the data zone in which the primary replica is currently located. Customers can still communicate with the RDS instance using conventional approaches that would be used for a single data zone, as customers can receive the endpoint DNS name of a data store as soon as the status of the RDS instance is "Available," for example, and connect to the instance using the endpoint DNS name. In the event of a replica failure, RDS can failover the database to the corresponding secondary replica, and the endpoint DNS name can will be aliased to the new primary replica. The database endpoint DNS name remains a constant in many embodiments, not changing during the lifetime of the replicated instance.

In some embodiments customers can be provided with the ability to convert a non-replicated instance to a replicated instance, such as by calling a "ModifyDBInstance" or similar API with the Replicated parameter set to "true." This can cause the database to be converted to a replicated instance at an appropriate time, such as during the next maintenance window or immediately after the request, as may depend on the API call parameters, etc.

Various embodiments take advantage of a block-level replication mechanism, such as a kernel module that implements a share-nothing, replicated storage solution mirroring the content of block devices between servers. BLRM works on top of block devices (i.e., hard disks or logical volumes). It uses a primary-slave replication architecture wherein the primary replica directs all the updates to the underlying block device. All input and output (I/O) requests to the block device are intercepted by the BLRM kernel module, with all write operations being automatically and synchronously replicated. BLRM provides inherent failure detection of peer devices, and invokes appropriate recovery handlers when a peer node is unreachable. BLRM also can automatically resynchronize a temporarily unavailable node to the latest version of the data, in the background, without interfering with data access at the primary replica. BLRM uses generation identifiers ("GIs") to identify generations of replicated data, whereby BLRM can determine aspects such as whether the two nodes are members of the same replica pair, the direction of background re-synchronization (if necessary), and whether partial or full re-synchronization is needed. A BLRM driver can start a new generation at any appropriate time, such as during the initialization of a replica pair, when a disconnected standby replica is switching to the primary replica, or when a resource in the primary role is disconnecting from the secondary replica. While a block-level replication mechanism is used herein as an example for purposes of explanation, it should be understood that any other appropriate block-level technology or mechanism can be used within the scope of various embodiments.

As discussed, RDS data instances in various embodiments can be built upon one or more systems or platforms. For example, the instances can be built upon a virtual computing environment that enables a customer to utilize Web services or another appropriate approach to launch instances with a variety of operating systems and manager those instances. An example of a Web service providing such a virtual computing environment is the Elastic Compute Cloud (EC2) service offered by Amazon.com, Inc. The data instances also can be built upon a block-level storage mechanism that can provide off-instance storage that persists independently of the life of an instance. A block store mechanism can provide storage volumes that can be attached to an instance and exposed as a device within the instance. An example of a block store platform is provided in co-pending U.S. patent application Ser. No. 12/188,949, filed Aug. 8, 2008, entitled Managing Access of Multiple Executing Programs to a Non-Local Block Data Storage," which is hereby incorporated herein by reference. A logical volume (e.g., LVM layer) can be built on top of the block storage volumes and an appropriate file system, such that the customer database can run on top of the LVM/file system layer. For a replicated database in one embodiment, BLRM can run on top of the LVM layer. BLRM in such an embodiment will intercept all I/O requests and send those requests to the logical volume, which in turn can split the requests across multiple block storage volumes. The use of a logical volume can provide the ability to handle multiple block storage E volumes, as well as the ability to easily expand storage, etc. Layering BLRM on top of LVM also can allow write operations to be replicated across the replicas.

Figure 4:
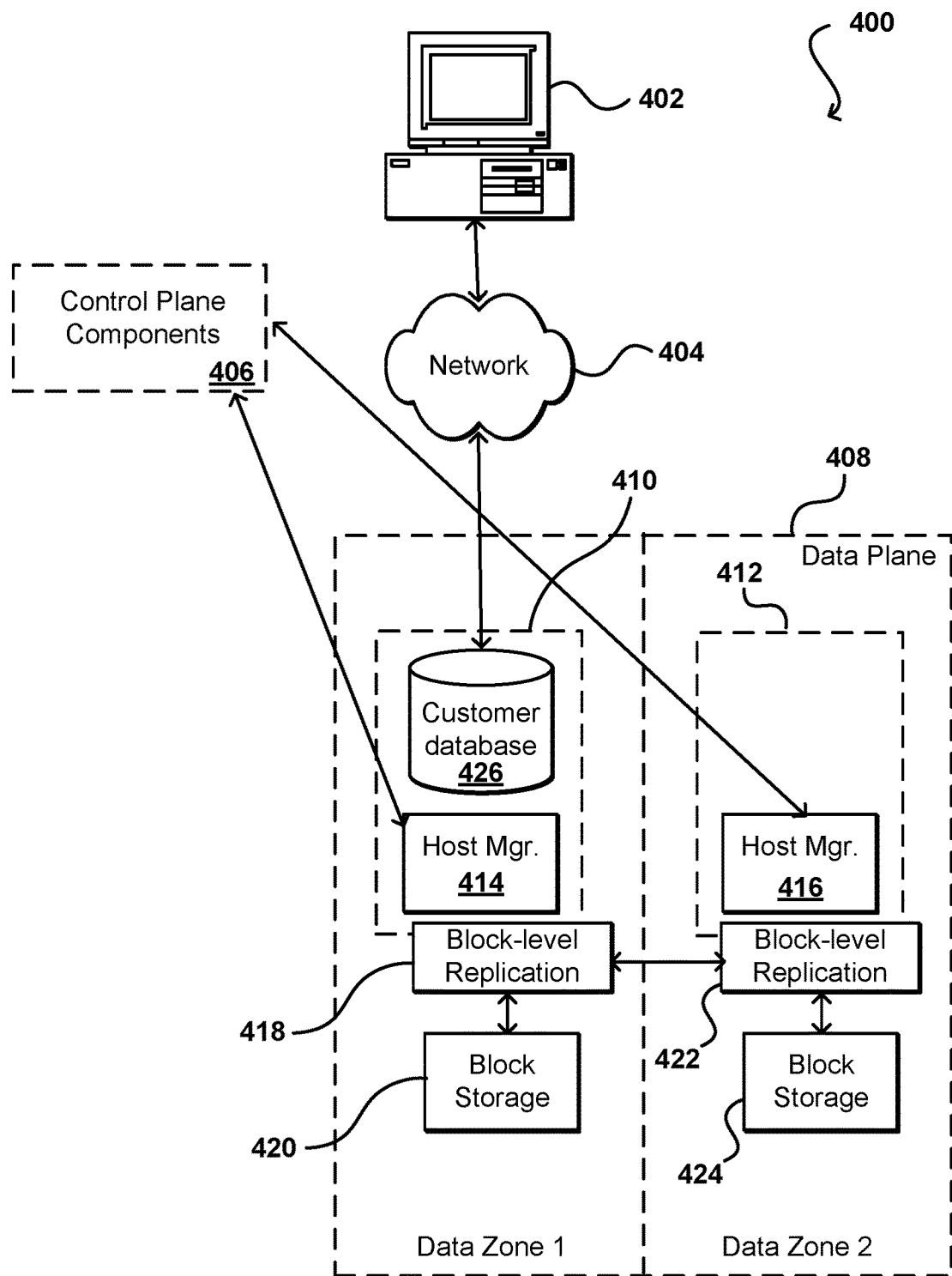
FIG. 4 illustrates an example implementation for running a replicated data instance across multiple data zones that can be used in accordance with one embodiment.

FIG. 4 illustrates an example of a mechanism 400 for implementing a primary-secondary replication model to provide a replicated RDS instance. In this example, the primary replica 410 and the secondary replica 412 are located in different data zones (1 and 2) of the data plane 408, or database environment. Each replica is built on top of the block storage mechanism, here illustrated as a BLRM layer 418, 422 for managing I/O to a block store 420, 422 for each replica. The components of the control plane 406, such as may be similar to those discussed with respect to FIG. 2, are able to create the replicated RDS instance by issuing configuration commands to the local host manager 414, 416, for example, which can perform the necessary setup operations. As seen in the figure, a block-level mechanism such as BLRM 418, 422 is positioned to intercept all I/O requests at the block device level, and write information for the requests to the local disks and the remote disks 420, 424. In this example, the database 426 (e.g., SQL) is run only in the primary replica 410, and all clients 402 run their database transactions on the primary replica 410 (via an appropriate network 404). The database 426 is not run on the secondary replica 412, and a file system also might not be mounted on the secondary replica, as the database will generally not be aware of the updates in the underlying device.

Each database client 402 can automatically discover the current primary replica using an RDS database DNS endpoint name, which can alias to the host name of the primary replica 410. By using DNS to discover the current primary replica, compatibility can be maintained with existing database clients, such as native MySQL clients, JDBC, PHP, C #, and Haskell, for example. While DNS caching can potentially cause clients to attempt to connect to an old primary replica, a client will not be able to talk to the database by connecting to a secondary replica, as no database is run in the secondary replica. The customer can then know to obtain the proper DNS information.

As discussed, database replication can be supported across multiple underlying data instances running in the same or different data zones. Once a write operation is committed using a synchronous approach, the data will not be lost except in the extremely rare case where all replicas are unavailable due to the failure of multiple data zones, etc. Such an approach can provide higher availability than a single database instance, as a single replica failure does not cause an outage to the database for an extended period of time. For instance, if the primary replica of a database is down, the system can perform a failover operation to a secondary replica in many cases. Further, such an approach can provide higher durability than a non-replicated database, and can protect from failures such as a failure of an data zone or single block storage volume failure, etc.

As previously mentioned, RDS can take advantage of a block-level mechanism such as BLRM to mirror the content of block devices between servers. A primary-slave replication architecture enables the primary to accept and write all the updates to the block device. All I/O requests to the block device are intercepted by the BLRM kernel module, such that the writes can be synchronously replicated. BLRM utilizes generation identifiers ("GIs") to identify generations of replicated data. BLRM uses this mechanism to determine whether two nodes are in fact members of the same replica pair, as opposed to two nodes that were connected accidentally. GIs also can be used to determine the direction of background re-synchronization, if necessary, and determine whether partial or full re-synchronization is needed. In at least one embodiment, the GIs are universally unique identifiers (UUIDs) and are not monotonically increasing sequence numbers. A BLRM driver can start a new generation during the initialization of replica pair, when a disconnected secondary replica is switched to the new primary replica, or when a resource in the primary role is disconnecting from the secondary replica, etc.

In an example where a replica pair (e.g., primary replica P and secondary replica S) is initialized and connected for the first time, the primary replica P can generate a new GI, such as $GI_1$. If the primary replica P gets disconnected from S and moves into a degraded mode, where P performs all the I/O without synchronous replication, P can generate a new GI, such as $GI_2$. Even in the case where P and S are disconnected due to a network partition, however, S will not generate a new GI. In this example, the primary replica P keeps in its metadata the new and the previous GIs ($GI_2$ and $GI_1$, respectively). One reason for storing the previous GI is to optimize on secondary replica recovery. For instance, there can be a temporary network partition that causes S to be disconnected momentarily. Subsequently, when the partition heals and when S is reattached to P, P can see that the current GI of S is the previous GI for P, such that P can ship only those blocks that were changed between the two data generations.

In an example where there is a failure of the primary replica, S can be promoted to the new primary replica when P is detected to be unavailable. When the command is issued to promote the secondary replica to the new primary replica, the BLRM can generate a new GI at the new primary replica (formerly S). Thus, when P (the original primary replica) rejoins the cluster and communicates with S, P can determine that the data generation has changed and P has to synchronize data from S.

As discussed, the primary replica P can accept all writes and reads, and the DNS_primary can alias or cname to the DNS name of the primary instance. The secondary instance S can receive all updates through DRDB replication (or a similar block level replication) protocol from the primary replica. No devices are mounted or databases started in the secondary replica. When enabling failover, another component that can be utilized is a monitoring component M. A monitoring component can monitor the health of the primary and/or secondary replicas and initiate appropriate failover actions when a failure occurs. The monitoring component in one embodiment periodically pings, or otherwise communicates with, the primary and secondary replicas. This communication can include a heartbeat communication, for example, that happens at regular intervals such as a number of seconds specified by a T_heartbeat or similar parameter. Whenever a monitoring component pings P and S, the monitoring component in one embodiment issues a HTTP getStatus( ) command to the host manager running in each replica. When P and S each receive the call, the replicas can execute a BLRM or similar status call to determine the current state of each replica. For example, primary replica P can run a BLRM tool command to determine the status, such as IN_SYNC, STALLED, DEGRADED, DEAD, etc.

In addition to reporting the status, the each of the replicas can also report their respective GI to the monitoring component, which can store the generation numbers in memory. Whenever a new monitoring component bootstraps, the new component can read the list of replica pairs, as well as the endpoints, from a strongly consistent data store (i.e., the monitoring database), and store the information in memory. During each status ping, the monitoring component can determine whether the number is same. If for some reason the number is different, the GI value can be updated in memory.

Figure 5:
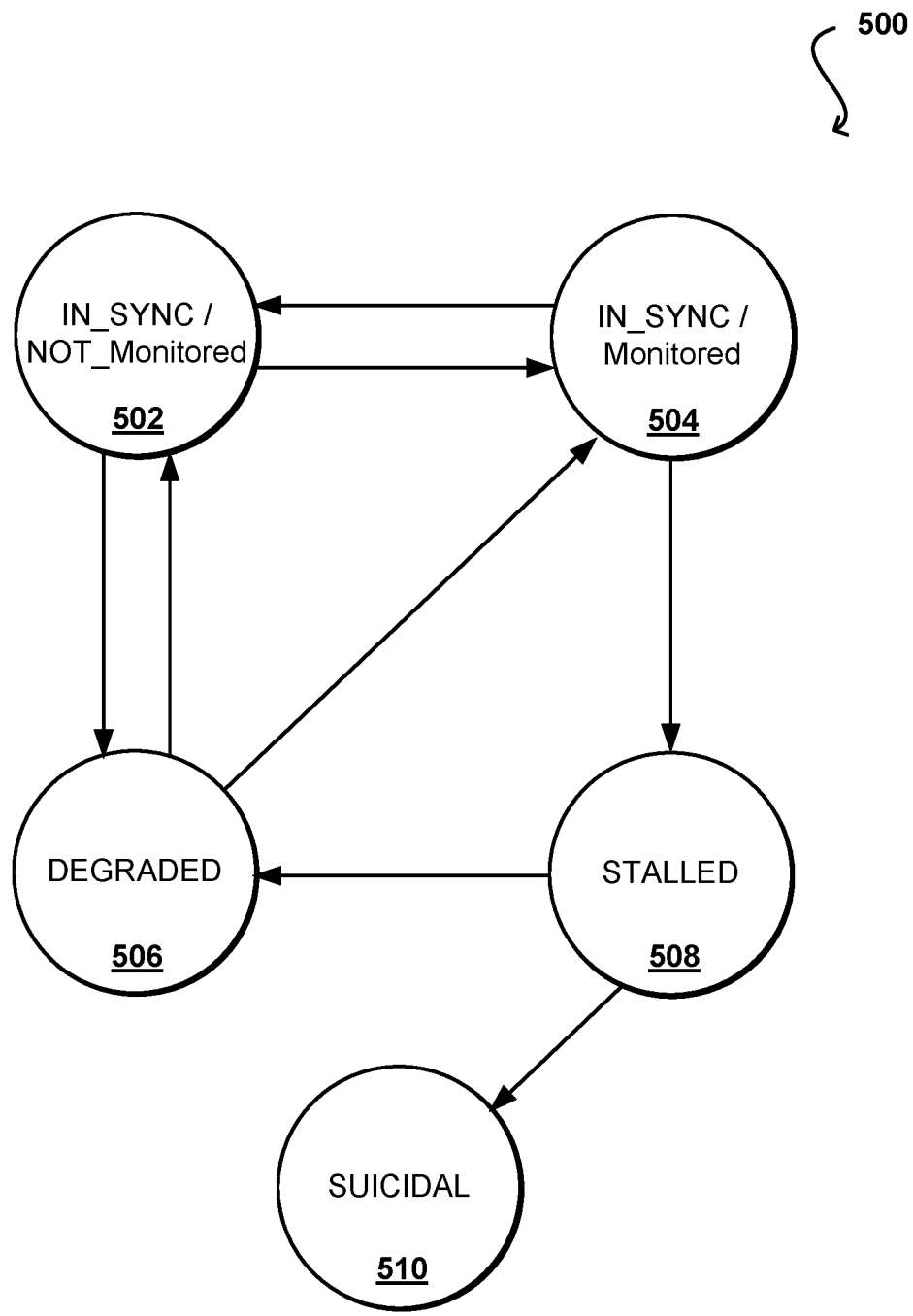
FIG. 5 illustrates an example state transition diagram for a primary replica in accordance with one embodiment.

A primary or secondary replica can be in one of at least two monitored states. FIG. 5 illustrates an example of a state transition diagram 500 for a primary replica in accordance with one embodiment. A replica can have a MONITORED state when the replica is connected to the monitoring component. A replica can be in a NOT_MONITORED or similar state when the replica is not connected to the monitoring component. A primary instance can also be in one of a plurality of data synchronization states. For example, P can be in an IN_SYNC state when both P and S are up and can communicate with each other, where all writes are synchronously written between P and S. Viewing the state diagram, at 504 where the primary replica is in an IN_SYNC/Monitored state, the primary replica can communicate with the secondary replica, all writes are succeeding, the BLRM is heartbeating, and the primary is being monitored. If the primary is disconnected from the monitoring component but still in sync with the secondary replica, the state can transition to state 502. At state 502, the primary can communicate with the secondary replica and both replicas are connected and up-to-date, but the primary is disconnected from the monitoring component and thus is not being monitored. The secondary replica can also be in a CONNECTED state, where the secondary replica is healthy and in contact with the primary replica, and can be in a DISCONNECTED state when the secondary replica is healthy but out of contact with the primary replica. Thus at states 502 and 504 the secondary replica would be CONNECTED, but at the other states would be DISCONNECTED.

The primary replica can have a STALLED or similar state 508 when P is monitored but is disconnected from, or otherwise out of contact with S, and cannot proceed with any I/O operations, as all writes are frozen. The primary replica can have a DEGRADED or similar state 406 when P is disconnected from S and has switched to non-replicated mode. This allows P to continue serving reads and writes when S is down or otherwise unreachable. P can reach the DEGRADED mode from either of states 502 or 508. P may not remain in DEGRADED mode for long in many embodiments, as RDS will typically create a new standby replica. Once a new secondary has been instantiated, is fully synchronized with the primary replica, and is being monitored by the monitoring component, the state can transition back to state 504, where the replicas are IN_SYNC and Monitored.

The primary replica can be in a SUICIDAL or similar state 510 when P is disconnected from S and also is in, or otherwise enters, a NOT_OBSERVED state. In this case, the state of P can be changed to SUICIDAL after a period such as T_failover seconds. This state 510 can only be reached from a STALLED state 508 in some embodiments, and occurs when P is out of contact with the monitoring component. In this state, the primary replica "kills" itself by shutting itself down, or rebooting its data instance.

Figure 6:
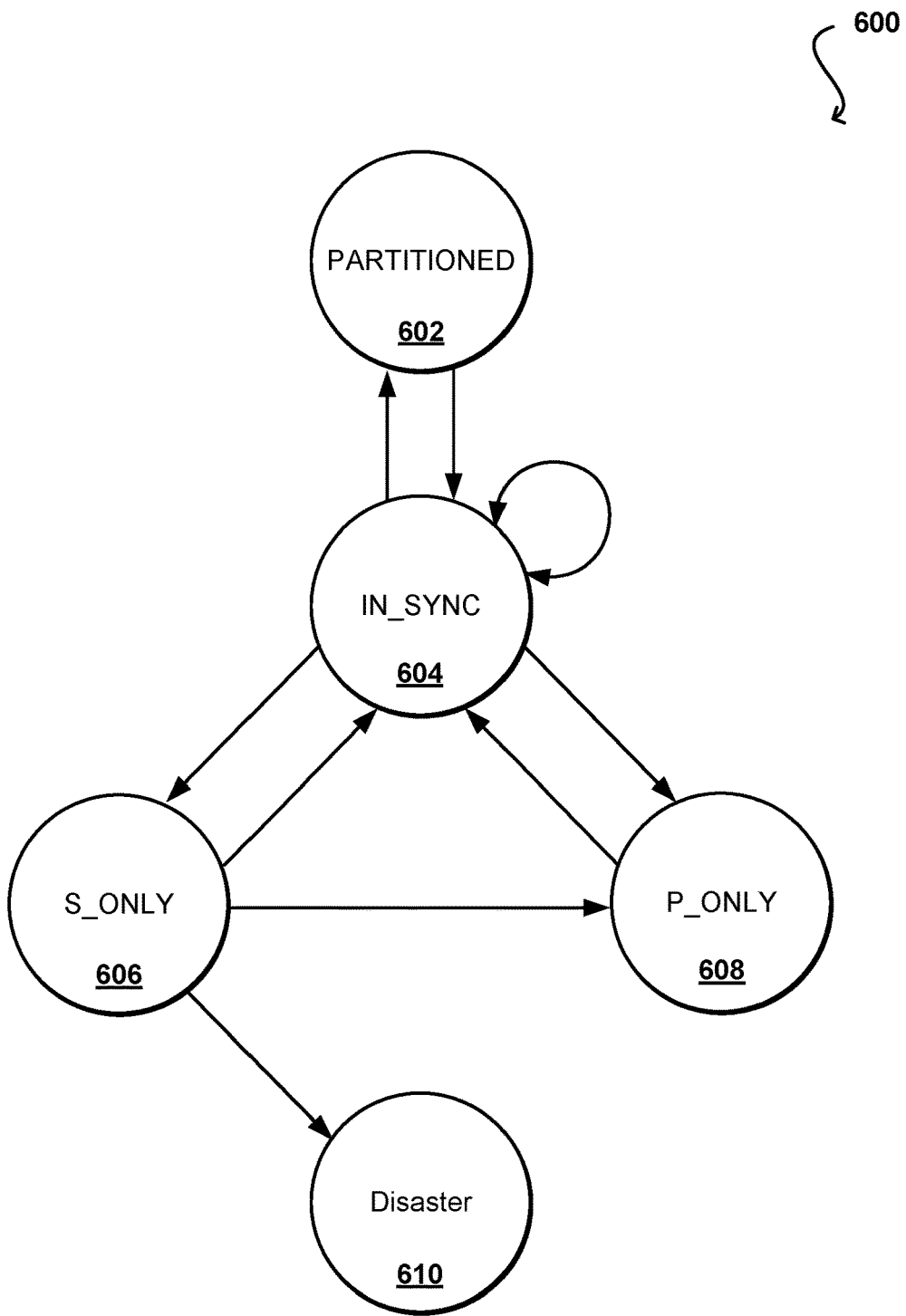
FIG. 6 illustrates an example state transition diagram for a monitoring component in accordance with one embodiment.

As part of a monitoring and failover architecture for implementing such processes, each replicated database (i.e., the replica pair) is monitored by a monitoring component. In RDS, a single monitoring component can monitor multiple replica pairs. Further, the system can utilize a plurality or "fleet" of monitor nodes. As discussed, a monitoring component can determine the state of a monitored database by continually pinging the replica pair at appropriate intervals, such as every T_heartbeat seconds. FIG. 6 illustrates an example of a state transition diagram 600 for a replicated database from the point of view of a respective monitoring component M. When the primary replica is in an IN_SYNC state and the secondary is connected, M can view the database as being in an IN_SYNC or similar state 604. M can also view the database as being in state 604 when the monitoring component cannot communicate with one of the replicas due to a network partition, for example, but the other replica indicates to the monitoring component that the replicas are connected and in sync, such that there is no need to perform a failover event.

If for some reason M can no longer communicate with both the primary and secondary replicas, either the monitoring component is partitioned away or both replicas are unavailable at the same time. In either case, M can view the state of the database as moving into a Partitioned or similar state 602. This can put both the primary and secondary replica in a NOT_Monitored state. When the monitor partition heals or when a new monitoring component is assigned to the database, the state can return to an IN_SYNC state 604.

If M can no longer communicate with the primary replica, and the secondary replica cannot communicate with the primary replica such that it is in a Disconnected state, the monitoring component can view the database to be in an S_ONLY state 606. If, within a period of time such as T_failover seconds, the monitoring component is able to re-establish communications with the primary replica, the state can return to IN_SYNC 604. If the monitor is not able to communicate with the primary replica for at least T_failover seconds, the monitoring component can decide to promote the secondary replica to the new primary. If the secondary replica confirms that the current GI is the same as the last known GI of the primary replica, and the secondary replica confirms the promotion request, the state can transition to a P_ONLY state 608, until a new secondary is instantiated and fully synchronized with the new primary, at which time the state can transition back to IN_SYNC 604.

If, however, the monitoring component decides to promote the secondary replica to the new primary replica, but the secondary request rejects the promotion request, the state can transition to a Disaster or similar state 610. The secondary might reject the request because the current GI for the secondary replica is different from the last know GI of the primary replica. In other cases, a response might not otherwise be received from the secondary replica. This could happen when there is a massive unavailability, or in the highly unlikely event that the GI or membership information has been corrupted, etc.

In another case where the state is IN_SYNC 604, the monitoring component might lose the ability to communicate with the secondary replica, and the primary replica might also lose the ability to communicate with the secondary replica such that the primary replica is in a STALLED state. In this case, the state monitoring component can request that the primary replica move to a DEGRADED state, and the state as viewed by the monitoring component can transition to a P_ONLY or similar state 608. With the monitoring component and primary replica not able to communicate with the secondary replica, and the primary replica being in a DEGRADED mode, a new secondary replica can be instantiated and fully synchronized with the primary replica, whereby the state as viewed by M can transition back to IN_SYNC 604.

Figure 7:
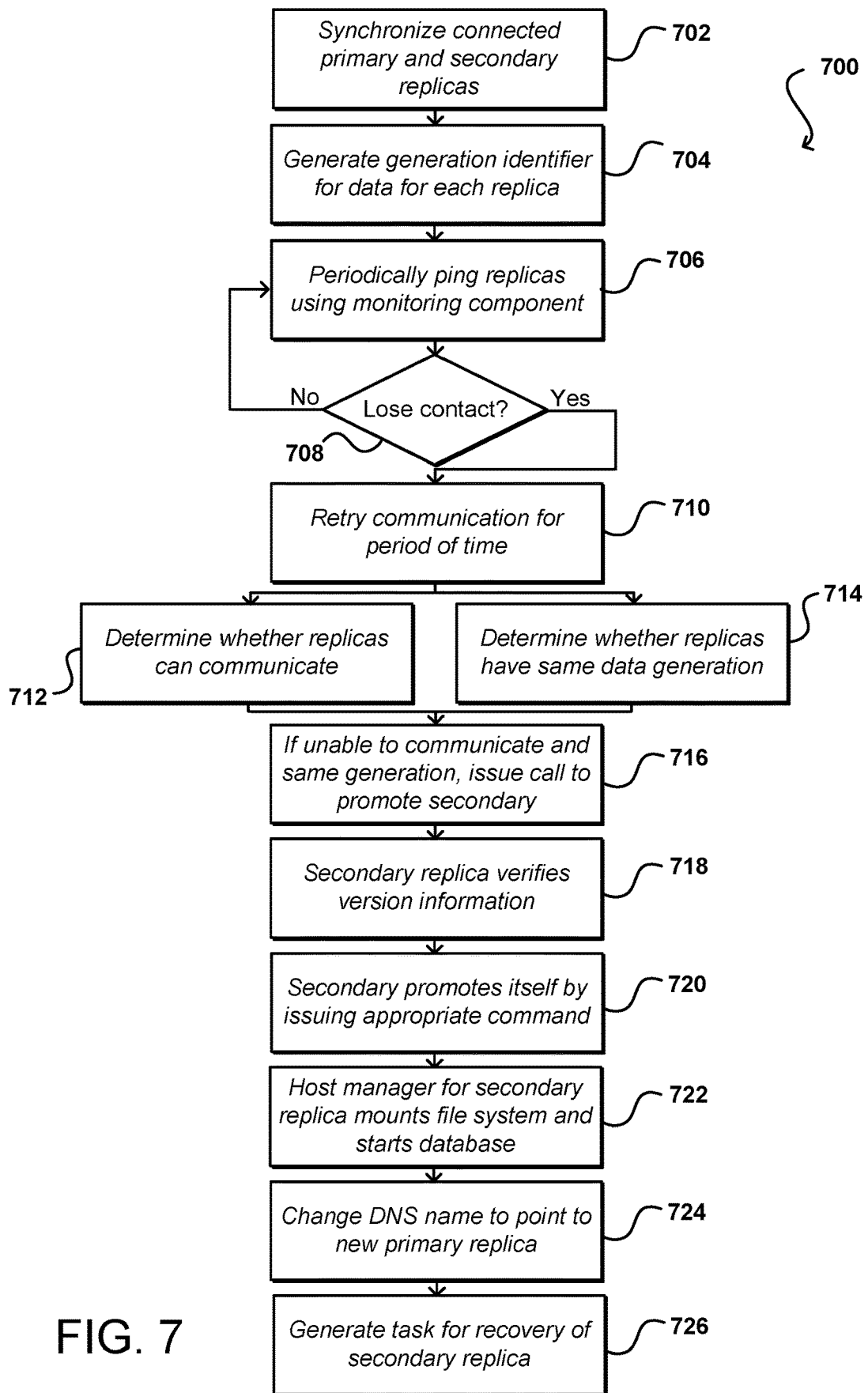
FIG. 7 illustrates an example process for performing a failover operation that can be used in accordance with one embodiment.

As can be seen by the state transition diagrams, a failover algorithm implemented by the monitoring components in at least one embodiment can cause a monitoring component to promote a secondary replica to be the new primary replica for an instance under certain circumstances. As should be understood, this example merely represents one path through the state diagram of FIG. 6. FIG. 7 illustrates an example process 700 for failing over to a secondary replica that can be used in accordance with one embodiment. In this example, the primary and secondary replicas are provisioned, connected, and synchronized 702. A generation identifier (GI) is generated for each replica to identify the current generation of replicated data 704. A monitoring component is assigned to the replicas and periodically pings the replicas 706. A monitoring component being assigned to a replica pair can obtain, or be provided with, a "lease" for that pair, which can expire after a period of time. The lease typically will be received from a host manager for the primary replica, and an event processor identifier and lease time can be stored in both replicas such that the event processor leasing scheme is able to survive the crash of a primary replica. In this way, monitoring components can periodically be released from replicas, and thus can be moved to other pairs for purposes of load distribution or partitioning, or otherwise manipulated for any of a number of other such reasons. At or near the end of a lease period, a monitoring component can attempt to renew the lease, a decision can be made not to renew a lease, etc., as discussed elsewhere herein. If the monitoring component loses contact with the primary replica 708, the monitoring component can attempt to retry for a period of time 710. If the monitoring component regains contact with the primary at any time, the monitoring process can continue. If the monitoring component is out of contact with the primary replica for a period of time such as T_failover seconds, a determination is made as to whether the secondary replica is able to communicate with the primary replica 712, or whether the secondary replica is in a DISCONNECTED state. A determination also can be made as to whether the state of the primary replica at the time contact was lost was known to be IN_SYNC with the secondary replica 714. The determinations can be made separately or at substantially the same time in various embodiments. If the secondary replica cannot communicate with the primary replica, and the replicas were synchronized (e.g., had the same GI value), the monitoring component can issue a command to promote the secondary replica to the new primary replica 716. If the last state of P cannot be determined, no failover occurs. A monitoring component may not know the state of P if the process or machine rebooted, or if a new monitoring component took over. In that case, the state can be treated as DEGRADED.

When promoting a secondary replica to be the new primary replica, a monitoring component can issue a command such as promoteToPrimary(oldGI) to the host manager for the secondary replica. In this example, "oldGI" is the last known GI of the host manager for the primary replica. Upon receipt of this request, the secondary replica can try one last time to communicate with the primary replica. If the replicas still cannot communicate, the secondary replica verifies that its current GI is same as oldGI (of the primary replica) 718. The secondary replica also can verify the leasing information, whereby the monitoring component issuing the request or sending the status request is a valid monitoring component for that replica, or the current "lease holder" for the replica. If so, the secondary replica confirms that it can promote itself, and becomes the new primary by issuing the appropriate BLRM command 720. The secondary replica returns the new GI to the monitoring component as a response to the promoteToPrimary( ) request. Subsequently, the host manager for the new (promoted) primary replica mounts the file system and starts the database (e.g., MySQL) 722. When the monitoring component has successfully promoted the secondary replica, the DNS_primary cname can be pointed to the new primary replica 724, as may be performed by the monitoring component or other component of the control plane. Subsequently, the instance state can be marked to be in need for secondary recovery 726.

If, however, the current GI for the secondary replica is not the same as oldGI, it might not be safe to promote the secondary replica to be the new primary replica. In this case, the promotion process can be aborted and an alarm generated for operator intervention (or another appropriate remedial action). If the operator cannot resolve this issue, a point-in-time recovery can be performed by restoring the database to the last well known point.

Viewing the diagrams, a number of different failure cases can be determined. For example, in a first failure case the primary and secondary replicas are running, and are communicating with an operating monitoring component. From the point of view of the monitoring component, as long as the component is able to communicate with each instance periodically, such as within at the most T_monitoring component seconds, everything is running as expected. The primary's state in this case would be "IN_SYNC/OBSERVED."

In the failure case where the network link between the monitoring component and the secondary replica is partitioned away, however, the primary would be able to communicate with the secondary and the monitoring component, but the monitoring component would not be able to communicate with the secondary replica. From the primary's point of view, all writes are still successful such that the primary is still in an IN_SYNC/OB SERVED state such that no secondary recovery is initiated. From the point of view if the monitoring component, the component detects a secondary failure, but the primary is still synchronized with the secondary so the monitoring component does not have to perform and operation and can simply continue attempting to communicate with the replicas.

If, instead, the monitoring component is not able to communicate with the primary component, such as in response to a network partition, the secondary replica will be able to communicate with the primary replica and the monitoring component but the primary replica will be unreachable from the monitoring component. From the point of view of the primary, after n*T_heartbeat seconds, the primary will move to a NOT_OBSERVED state, as the primary replica not been in contact with the monitoring component. In some embodiments, the value of n can be set to n≥2. The state of the primary thus can be IN_SYNC/NOT_OBSERVED. From the point of view of the monitoring component, only the secondary replica is reachable but the secondary replica is still in contact with the primary replica, such that the monitoring component does not initiate any failover.

Figure 8:
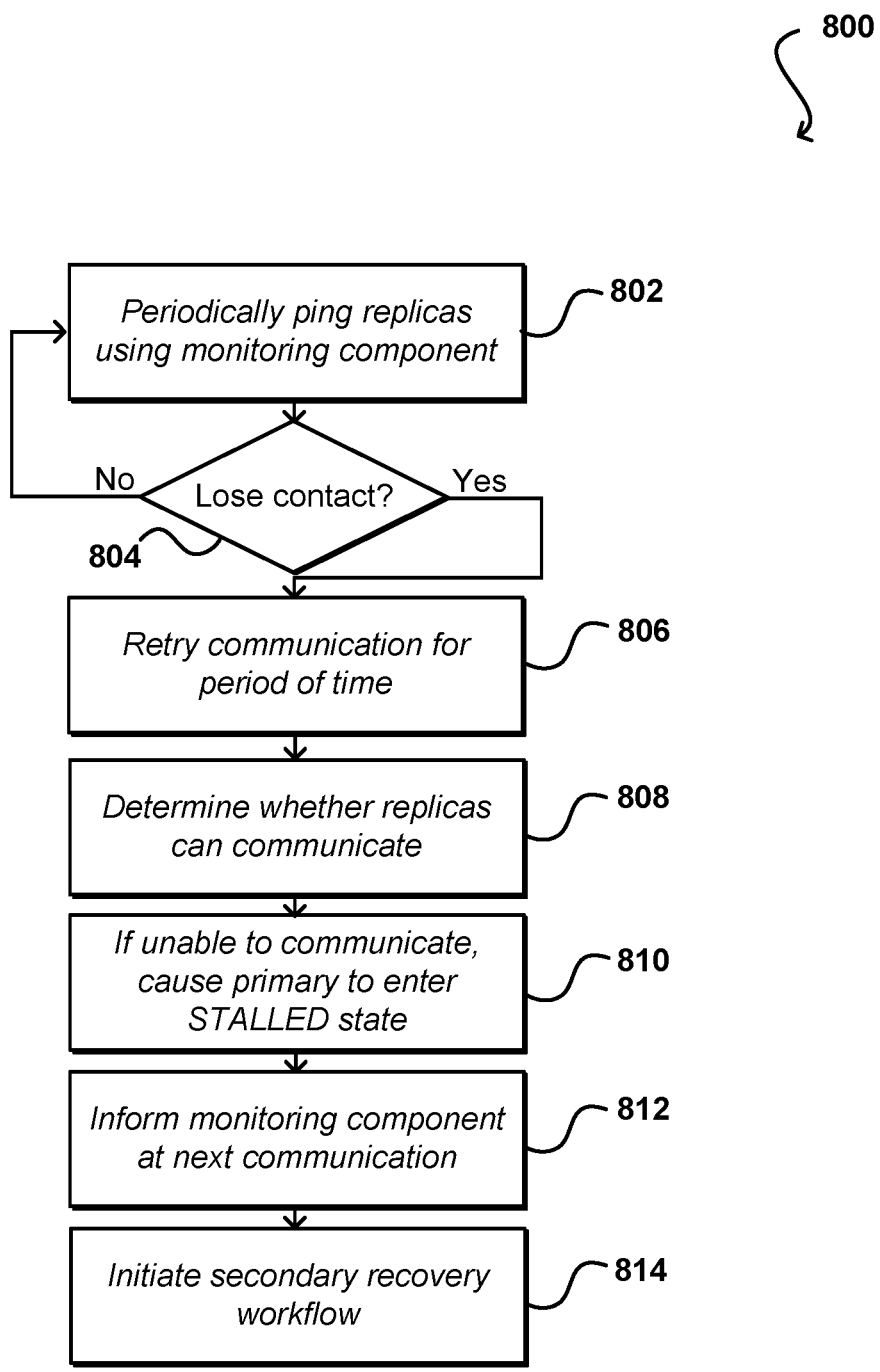
FIG. 8 illustrates an example process for recovering a secondary replica that can be used in accordance with one embodiment.

In one example failure case, the secondary replica might be down due to factors such as a node failure or network partitioning. FIG. 8 illustrates an example of a process 800 for performing secondary recovery that can be used in accordance with at least one embodiment. This example assumes that the replicas are already provisioned, communicating, and synchronized, and the replicas are being monitored by a monitoring component 802. If the monitoring component loses contact with the secondary replica 804, the monitoring component can attempt to retry for a period of time 806. If the monitoring component regains contact with the secondary replica at any time, the process can continue. If the monitoring component is out of contact with the secondary replica for a period of time, a determination is made as to whether the primary replica is able to communicate with the secondary replica 808. If the primary replica is unable to communicate with the secondary replica, the primary can go into a STALLED state after T_sync seconds 810. After entering the STALLED state, the primary replica can wait for n*T_heartbeat seconds to hear from the monitoring component. If the primary replica hears from the monitoring component within this time unit (i.e., the primary is in a MONITORED state), the primary goes to a DEGRADED state and informs the monitoring component in the next handshake 812. From the point of view of the monitoring component, the state goes to P_ONLY, where the monitoring component finds that the secondary replica is unreachable. Upon determining this, the monitoring component marks the state of the database instance as a state such as NEED_SECONDARY_RECOVERY, and initiates a secondary replica recovery workflow 814, such as is discussed elsewhere herein.

In another failure case, all the hosts can be up and running, but the primary replica can be partitioned away from the monitoring component and the secondary replica, such as may be due to an data zone partition or a bad rack uplink. Thus, the monitoring component is able to communicate with the secondary replica, but neither the monitoring component nor the secondary replica is able to reach the primary replica. From the point of view of the primary replica, after T_sync time units, the primary replica goes into a STALLED state. After entering the STALLED state, the primary replica waits for n*T_heartbeat seconds to hear from the monitoring component. In this case, the primary replica does not hear from the monitoring component and is disconnected from the secondary replica, such that it moves into a SUICIDAL state and "kills" itself by rebooting its instance when it comes back as a secondary replica. From the point of view of the monitoring component, the monitoring component reaches the state of S_ONLY, where it finds that the primary replica is unreachable. The monitoring component checks with the secondary replica in the next handshake to determine whether the secondary replica can communicate with the primary replica. In this case, the secondary replica will claim that it is in a DISCONNECTED state. The monitoring component waits for T_failover seconds and then confirms that the primary replica is still unavailable. If so, the monitoring component causes the secondary replica to be promoted to be the new primary replica, if the previous state of the database was in IN_SYNC and if the current GI of the secondary replica is same as last known GI of the primary replica. The time value of T_failover can be set to n*T_heartbeat+T_buffer, where n is the same parameter as previously described before in earlier cases, set to n≥2. T_buffer is the worst case time expected for the primary replica to "kill" itself.

In a similar case where the primary is down and there are no other issues, there also can be a failover. In this case, however, the primary does not have any transition states as the primary replica has gone down and will not go into a SUICIDAL or other such state.

In another failure case, the primary and secondary replicas can be functioning and communicating as expected, with no network issues, but the monitoring component can go down or otherwise become unavailable. From the point of view of the primary, everything is still in an IN_SYNC data synchronization state, but the primary replica notes that it is in a NOT_OBSERVED state.

As discussed, the control plane includes a distributed set of event processors, or event processing fleets, configured to monitor the RDS instances and issue appropriate recovery actions when necessary. Each event processor can be assigned a portion of the monitoring workload for a portion of the RDS instances, such as by employing a simple hash-based partitioning algorithm where the hashing is done based on an InstanceIdentifier or similar identifying value. For monitoring a replicated instance, an event processor can function as the monitoring component. An event processor can determine the health of an RDS instance by pinging, or otherwise communicating with, all the replicas associated with that instance. If an instance is not replicated, then the event processor only needs to communicate with the single host manager for the instance.

There can be special considerations to partitioning the instance monitoring workload among the event processing fleets when there are replicated instances. In some embodiments, the monitoring system should scale substantially linearly as the number of instances increases. This scaling can be accomplished in various instances by adding additional event processors (e.g., hosts). There also can be constraints on the placement of the of the event processor, as it can be desirable for the event processor to be located in a different data zone from each replicas of the database being monitored by that event processor. By placing the event processor in a different data zone, the failure of a datacenter does not result in two simultaneous failures (e.g., failure of the monitoring component and at least one of the replicas) happening at the same time, causing the database to potentially reach an irrecoverable state. It also can be desirable to ensure that each database instance, including all replicas, are continually monitored. This can be accomplished in various embodiments by partitioning the database instances and assigning the monitoring ownership of each partition to one of the event processors. If an event processor fails for any reason, the partitions owned and monitored by the failed event processor should be redistributed evenly to other available event processors.

To ensure linear scalability of the monitoring system and still meet the constraints on the placement of the event processors, the event processing fleets in at least one embodiment are segmented into different groups based on the data zone in which each fleet resides. Each group can be configured such that the event processors within a group are associated with RDS instances whose replicas are not in the same data zone as the respective event processor.

As an example, there can be four event processor groups (G1, G2, G3, and G4) covering instances in four respective data zones (DZ1, DZ2, DZ3, and DZ4). For each replica pair, the monitoring workload can be apportioned between the groups that are not in the same data zones as the replica pair. In this example, the monitoring workload of RDS instances whose replica pairs are in DZ2 and DZ3 can be split across the event processors in G1 and G4. For replica pairs in DZ3 and DZ4, the workload can be is split between groups G1 and G2.

For all the replicated databases located in a given data zone, each event processor can compute the list of event processors that cover an data zone pair independently. Subsequently, for a given data zone pair, the event processor identifiers covering that data zone pair can be sorted lexographically. The database identifiers also can be sorted, and split across the zone pairs uniformly. For example, there can be databases with replicas in zones DZ2 and DZ3. These databases can be monitored by event processors in groups G1 and G4 together. For sake of simplicity, the database identifiers of the database in this data zone pair can be set as (DB1, . . . , DB1000), and there are two event processors in group G1 (EP1 and EP2) and two event processors in group G4 (EP3 and EP4), respectively. In this example, when EP1 bootstraps, EP1 can determine that there are 1000 databases to be monitored in the data zone pair (DZ2, DZ3) and four event processors that cover them. By sorting the event processor identifiers lexographically, EP1 can determines it can take DB1 to DB250, EP2 can take DB251 to DB500, EP3 can take DB501 to DB750, and EP4 can take DB751 to DB1000. EP1 can repeat the same steps to determine the databases that EP1 is in charge of monitoring for every replica pair it is eligible to monitor.

To detect the failure of an event processor, each event processor can be configured to send a HEARTBEAT message (e.g., over HTTP) to every other event processor periodically, such as every ten seconds. The event processors also can maintain a list of event processors and their status (e.g., AVAILABLE or DEAD) along with the last check-in time of each event processor. When a first event processor has not heard from another event processor for a time period greater than heartbeat_failure_time, which is typically some multiple of the heartbeat interval such as six times the heartbeat interval, the first event processor can declare the unresponsive event processor to be DEAD, or in a similar state, and can adjust its monitoring workload. When the unresponsive event processor host starts or recovers, the event processor can start itself in a BOOTSTRAP or similar mode for a time period, similar to the heartbeat_failure_time, to receive heartbeats from its peer event processor, and can start its heartbeating agent. After this time, the event processor can move itself to an OPERATIONAL mode where it determines its current slice of monitoring workload based on the state of the event processors assigned to its partition. One reason for leaving the event processors in BOOTSTRAP mode for a period of time is to ensure that the new event processor that joins the event processor collective and the remaining event processor have sufficient time to converge on the current state of active event processors.

In the event of a failure of an data zone, it is desirable to ensure that the instances being monitored by event processors in the failed data zone are taken over by the remaining groups. In one example, four event processor groups (G1, G2, G3, and G4) cover event processors in four data zones (DZ1, DZ2, DZ3, and DZ4) respectively. If DZ1 dies, the instance monitoring by the event processors in DZ1 can automatically be taken over by the event processors in the other data zones.

It is possible, however, that there might only be three data zones in a region, with three event processor groups (G1, G2, and G3) monitoring data zone pairs (DZ2, DZ3), (DZ3, DZ1), and (DZ1, DZ2). In the event that DZ1 goes down, G2 and G3 need to be redeployed in such a way that each group monitors instances whose secondary replica is in the same data zone as itself, in order to tolerate the failure of the data zone containing the primary replica. In various embodiments, a flag such as a "secondary-dz-colocation-override" flag can be turned on only when an data zone is out in a three-DZ region. If this flag is turned off, the groups partition the monitoring workload with the constraint that an event processor cannot reside in the same data zone as the replica pairs. If the flag is on, the group can override the constraint and re-align itself to select RDS instances whose secondary replica is in the same data zone as itself. This flag can be persisted in a monitoring database or similar data store in the control plane.

It also can be desirable to ensure that there is only one event processor monitoring a particular RDS instance. In certain embodiments, the failover algorithm requires that a single monitoring component (i.e., event processor) monitors a replica pair at any give time. This constraint can be utilized because it can be undesirable to have two event processors on either side of a network partition, with one event processor one trying to failover an RDS instance and another assuming that the primary is still alive, leading to a "split brain" scenario.

To ensure that only a single event processor is monitoring an RDS instance, an event processor can be required in some embodiments to explicitly acquire a lease from the primary replica of an RDS instance. In other embodiments, the monitoring component can acquire a lease from another component of the control environment, which manages the leases and interacts with the various components in the data environment. Only upon acquiring a lease from the primary replica of an RDS instance is an event processor eligible to initiate the failover for a given RDS instance, and only for the lease period such as T_lease. An event processor can acquire a lease from an RDS instance primary replica in one embodiment by pinging a database replica (e.g., by issuing a HTTP status ping( )), whereby the host manager of the database replica can hand out a lease, in addition to its usual response. In some embodiments the lease is handed out only if the replica is the BLRM primary, the primary and secondary replicas are in sync, and if there is still a valid lease given to another event processor. When the primary replica hands out the lease to an event processor, the primary replica can write the lease time and the event processor identifier to its BLRM drive. By writing to the BLRM disk when it is in-sync, the primary replica inherently notifies the secondary replica of the lease. Thus, only after the lease time and event processor identifier are successfully written (i.e., replicated in both replicas) will the primary replica hand out a new lease to the event processor. Further, by writing the event processor identifier and lease time in both replicas, the event processor leasing scheme is able to survive the crash of a primary replica. The secondary replica of an RDS instance never hands out any lease at any time in at least some embodiments. The secondary replica can accept a promoteToPrimary( ) or similar request only if the request is from the event processor whose identifier is same as the one in its BLRM drive.

When an event processor reboots or a new host takes over, the event processor assumes the state of the RDS instance (it has not monitored before) to be P_ONLY, a state where the primary replica is in DEGRADED mode. The event processor pings the primary and secondary replicas to determine the current state of the database and changes its state accordingly. As noted earlier, the event processor does not initiate any failover if a primary replica is assumed to be in DEGRADED state. By taking a "pessimistic" approach, there will be fewer mistakes when a new event processor takes over. When an event processor reboots or a new event processor takes over, the event processor pings both the replicas associated with a given host to determine which replica is the current BLRM primary. Once this information is collected, the event processor can check with the appropriate pDNS API to ensure that the DNS_primary CNAME points to the current primary replica. If not, the event processor can failover right away. This scenario can happen if an event processor has died in the middle of failover. Since it is possible that the DNS information can be incorrect due to DNS caching and other effects, the pDNS API can be queried without resolving the DNS name, as pDNS API reads the authoritative database. However, in the unlikely event that both the primary and secondary replicas think they are the rightful primary replica, the operator or responsible technician can be paged, etc.

The monitoring database in the control plane can store the list of current active database instances to be monitored, the type of each instance (e.g., replicated), and any events that the event processors collect for different customer-related events. As the number of databases increase, it can be necessary in some embodiments to scale beyond a single monitoring database. To this end, all the tables in the monitoring database can be partitioned. To enable monitoring DB partitioning, a "db partition map" can be employed along with the event processors. When an event processor has to persist an event related to a database instance, the event processor can consult the "db partition map" to determine the appropriate database to which to write information for the event.

Figure 9:
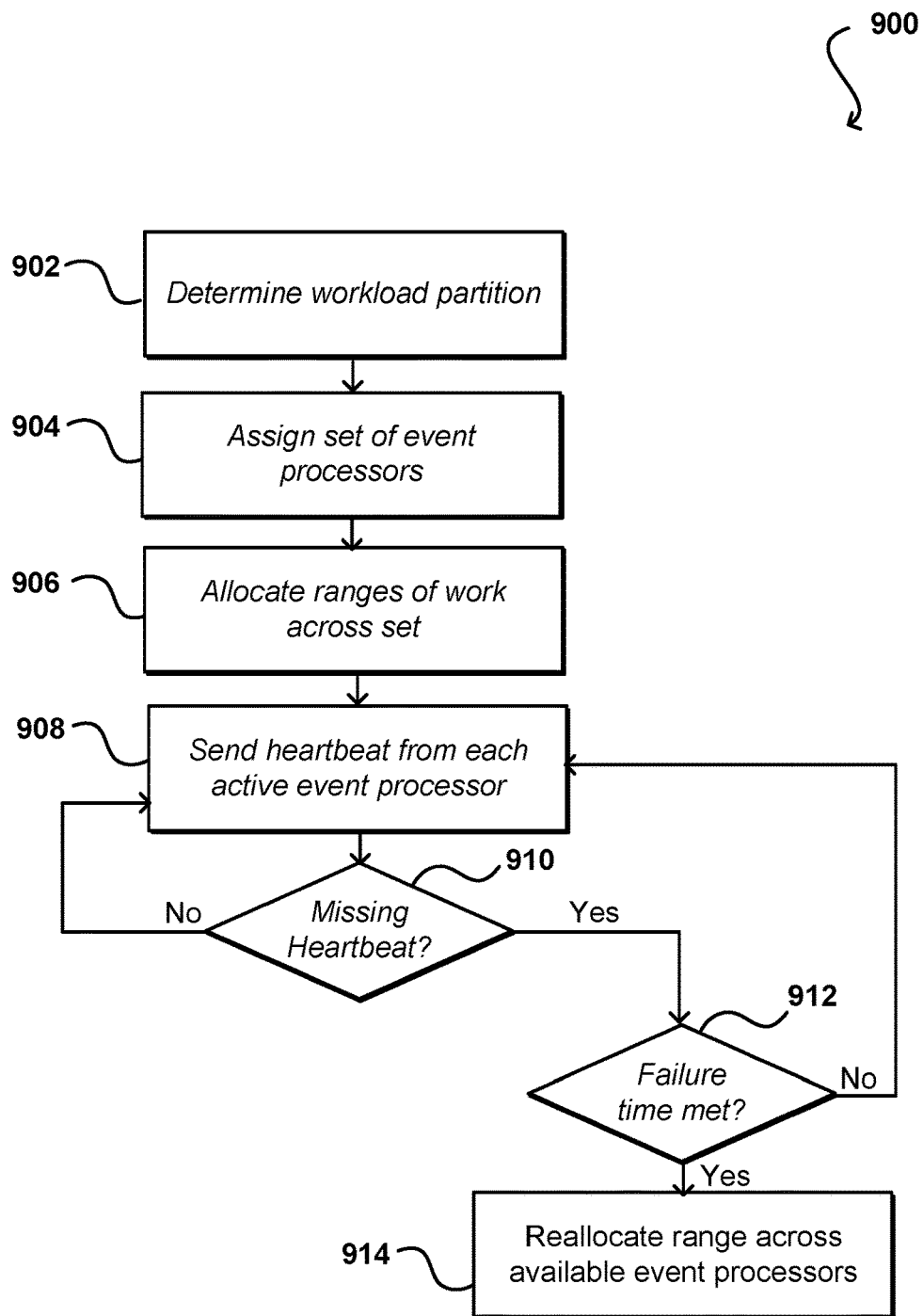
FIG. 9 illustrates an example process for managing event processors that can be used in accordance with one embodiment.

FIG. 9 illustrates an example process 900 for monitoring the health of event processors in a bucket and handling the failure of one of the event processors in accordance with one embodiment. In this example, at least one workload partition is determined for the data plane 902. Depending at least in part upon the number of data stores, instances, host managers, and other such components to be monitored, the overall workload may be partitioned into any of a number of separate partitions. A set of event processors can be assigned to each workload partition 904, and each event processor in the set is allocated a respective portion of the work for the assigned partition 906. At the appropriate intervals, each event processor sends a "heartbeat" message (e.g., over HTTP) to the event processors in the same set or bucket covering the same workload partition 908. The heartbeats can be sent at any appropriate interval, such as every ten seconds. A "heartbeat" in one embodiment refers to a simple multicast message that is sent to each event processor in a bucket to inform the other event processors of the status of the event processor sending the heartbeat. The event processors can maintain a list of event processors and their status (e.g., "available" or "dead") along with the last check-in time of each event processor. If it is determined that a heartbeat is received from each event processor in the bucket 910, the process can continue.

If, however, it is determined that an event processor in the same bucket has not responded with a heartbeat, then a determination is made as to whether the event processor has failed to send a heartbeat for a time period equal to, or greater than, a specified heartbeat failure time (e.g., be six times the heartbeat interval) 912. If the specified heartbeat failure time has not been reached, the process can continue. If the heartbeat failure time has been at least reached without a heartbeat from an event processor, each active event processor in the bucket can declare the non-responsive event processor to be "dead", or in a similar state, and can reallocate the responsibility ranges and take over a portion of the monitoring workload 914. As every active event processor in the bucket will fail to receive a heartbeat message from the failed event processor, the event processors can each expand the allocated workload by an appropriate amount to pick up the work of the "missing" event processor.

Figure 10:
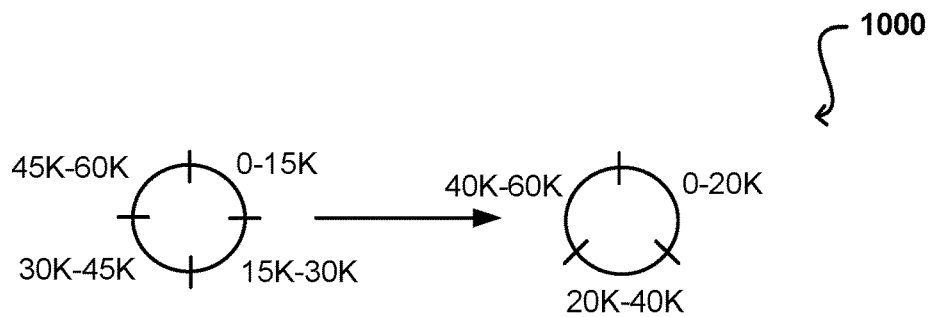
FIG. 10 illustrates an example of a reallocation due to a failed event processor that can be used in accordance with one embodiment.

If there are four event processors and 60,000 instances being monitored, as illustrated in the example 1000 of FIG. 10, then each event processor handles 15,000 instances (which can be ordered in lexographical order or another appropriate order by identifier, etc.). If one of the event processors fails, the other three event processors can re-allocate their respective range of responsibility, such that each event processor now handles 20,000 of the instances (still being consecutively ordered according to the identifier, etc.). Thus, since the instances are ordered using an ordering scheme, the event processors can adjust the range of the ordering scheme to be monitored, and do not have to map or otherwise track which "new" instances to monitor. The ranges being monitored can be stored in the monitoring data store, for example. Such an approach is also beneficial in situations where instances are added or removed, as the workload can be automatically distributed (substantially) evenly across the event processors. Heartbeating only within a particular bucket also can be more efficient and easy to maintain than a global heartbeating mechanism.

Figure 11:
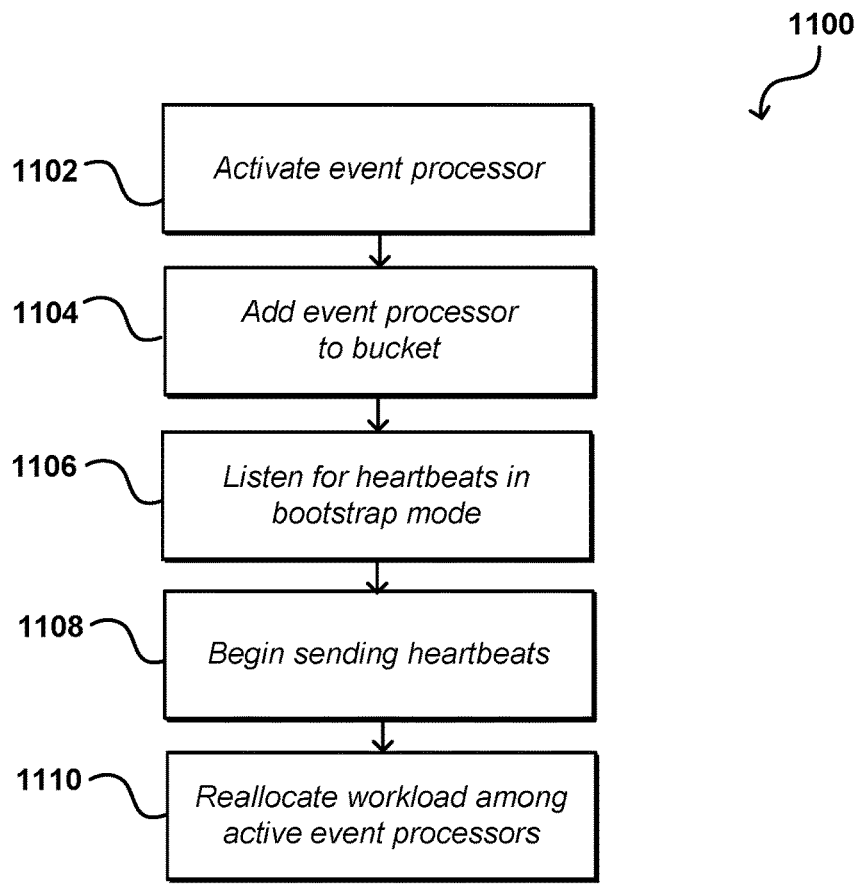
FIG. 11 illustrates an example process for adding a new event processor that can be used in accordance with one embodiment.

FIG. 11 illustrates an example process 1100 for reallocating the work ranges across a bucket when an event processor is added to the bucket, such as may be a result of adding additional processing capacity or a result of a failed event processor recovering and again being able to handle a portion of the workload. An event processor can become active 1102, such as by an event processor host restarting or recovering, or the host simply being activated or added to a bucket. The event processor also can be added to the bucket 1104, although in cases of recovery the event processor might already be assigned to that bucket. Upon the active event processor being added to the bucket, the event manager can enter a mode such as a "bootstrap" mode for a time period (e.g., the heartbeat failure time) to receive heartbeats from the peer event processors in the bucket 1106, to obtain information about the other event processors active in the bucket and determine a time for sending heartbeats, for example. The event processor can engage a heartbeating agent to also start sending heartbeats to the other event processors in the bucket 1108. After this time, the host can move itself to an "operational" mode, where each event processor can reallocate the range of work and determines its current slice of monitoring workload based on the state of the event processors assigned to its partition 1110. One reason for leaving the event processors in "bootstrap" mode for a period of time is to ensure that the new event processor that joins (or rejoins) the event processor collective, and the remaining event processors, have sufficient time to converge on the current state of active event processors.

An approach in accordance with one embodiment also over-partitions the event processors, such as by running each event processor at 50-60% of capacity. Such an approach enables at least one or two event processors to fail in each bucket without having a significantly negative impact on performance. A failed event processor will eventually become available again, such as where the respective host reboots. That event processor then can start exchanging heartbeats again, whereby the other event processors in the bucket can automatically detect the presence of the event processor. The allocated work can be automatically redistributed as discussed above, so that the work is relatively evenly distributed across the larger set of available event processors in the bucket.

In addition to the failure cases discussed above, there can be various other failure modes that can be addressed in accordance with the various embodiments. For example, a primary replica instance might reboot, such that when the host manager for the primary comes back online it first will find that the BLRM status has changed from "primary/secondary" to "secondary/secondary," as the primary replica comes back online as a secondary replica if the monitoring component has not already failed over to the secondary replica. It then can be up to the event processor (e.g., the monitoring component) to determine who should be the primary among the two replicas and make the appropriate promoteToPrimary( ) call. If a secondary replica instance reboots, the monitoring component will notice that secondary is out and can mark the instance for recovery. However, in the meanwhile, if the secondary replica comes back online (after reboot), the secondary recovery workflow can notice this and request that the host manager for the secondary replica attempt to reconnect. This can avoid the expense of creating a fresh secondary replica for a simple instance reboot scenario. If a non-replicated instance reboots, the host manager can automatically convert its status from a secondary to a primary replica without requiring the monitoring component to promote the instance. This can reduce the recovery time for instance reboot for a non-replicated instance.

When a primary replica fails and does not come back online, the monitoring component can detect the primary failure and promote the secondary replica to be the new primary. Subsequently, the monitoring component can mark the RDS instance state in the Admin data store to be in a state such as "PENDING/DEGRADED_NEED_SECONDARY_RECOVERY". This state can cause a recovery sweeper to kick start an appropriate recovery workflow. The recovery workflow can attempt to determine whether both replicas are alive. If the old primary replica has come back online as a secondary replica, such as where the reboot took a sufficient amount of time such that the monitoring component marked the replica as dead, the workflow can connect the old primary replica to the new primary and mark the recovery done, such as with a database state of OK, once the replicas are fully synchronized. However, if the old primary has not come back at all, the workflow can terminate the old instance and spin off a secondary replica using the same steps described with respect to creating a replicated instance. If the secondary replica fails, the monitoring component can detect the failure and mark the instance state in the Admin data store to be in a state where by recovery workflow kicks in, such as by using a "PENDING/DEGRADED_ NEED_SECONDARY_RECOVERY" or similar state. When the database crashes for some reason, the host manager of the primary replica can act as the nanny process and restart the database automatically.

As discussed, each partition of the monitoring workload can be covered by a set of event processors. Covering a single partition of the workload with a set of event processors enables the redistributing of the monitoring load across the remaining event processors in the event that one of the event processors fail or experiences any of a variety of other such problems. In one embodiment, each group of event processors is contained in a bucket or other such partition. Each event processor in a bucket is responsible for handling a range of instances in a single data plane, or grouping of instances in that plane. A failure detection process can be used to ensure that if a failure occurs, the other event processors in that bucket take over responsibility for the instances handled by the failed event processor. The monitoring data store in at least one embodiment holds the list of current active data instances to be monitored by the set of event processors in a bucket, as well as the information that the event processors collect for various customer-related events. As the number of monitored instances increases, it can be necessary to scale beyond a single monitoring data store. Thus, each table in the monitoring data store can be partitioned, including the db_poll_list.

In one embodiment, the event processors are deployed with a partition table of the following example format:

| Partition Id | Hash Range |
|---|---|
| P0 | 0-10000 |
| P1 | 10000-20000 |

This partition configuration can be deployed as a configuration file to the event processor hosts.

If a given workload partition generates a significant number of events that leaves the responsible set of event processors in a constant catch-up mode (i.e., not able to finish the assigned health checks within a certain time period), additional event processors can be added to the set responsible for that workload partition without having to repartition the data store. Using such a technique, the performance scalability can be differentiated from the data scalability issues. For example, a single partition generating so many events that the event processors cannot catch up can be distinguished from a situation where the single partition generate so many events that a single data store does not provide enough storage space.

The membership of the event processors and the partitions to which the event processors are assigned can be stored in a location such as an event processor membership configuration file. The membership configuration information can be deployed to the event processors in a group (such as in the same partition or bucket), and can have the following example format:

<EP identifier><EP Host Name><endpoint_port><Partitition Id>

When a single partition is covered by multiple event processors, each event processor splits the bucket ranges by sorting the event processor identifiers, such as by using a lexographic or hash-based sorting routine, and dividing the bucket ranges uniformly. Each event processor can independently determine the appropriate range to be monitored.

In such a system, it can also be important to ensure that the list or set of data stores and/or instances to be monitored are automatically populated and updated over time. One approach would be to create a database list table, for example, which is a shapshot replica of the instances which can be propagated as needed. Such an approach, however, can be difficult to maintain, as well as to ensure that each appropriate component has the most recent copy. Another approach would be to have the event processors query the data plane components, and then store the information locally in the control plane. Such an approach can create a lot of messaging traffic, and can be difficult to maintain and update. An approach in accordance with one embodiment instead enables each event processor to expose an interface such as a "setStatus" or similar API. As part of a "create" or "delete" workflow, for example, a task can be added to the end of the workflow which instructs the appropriate host manager to call the event processor that is, or was, in charge of managing the instance. The host manager can thus call the "setStatus" API of the event processor to set a status of the host, any time there is a change in status as a result of a workflow (or other such action). Each time an event processor receives a call through the "setStatus" API, information can be placed in a local data store to add the new host to its set of partitions, remove the host, etc. Information for the host also can be written to the monitoring data store or another appropriate persistent location.

In one embodiment, an authoritative list of current active data instances resides in the Admin data store. An active list of data instances to be monitored resides in the monitoring data store in a table such as a "db_poll_list" table. To add, remove, or update the status of an instance in the monitoring data store, the event processors expose an "updateHost" API that accepts parameters such as a data store identifier, data instance related parameters (e.g., an instance identifier and a DNS address), and an instance status (e.g., "add", "remove", or "update"). When an event processor receives this call, the event processor makes the appropriate changes (e.g., adding, removing, or updating an entry) to the db_poll_list table. For example, if a customer submits a request to create a data store with a data store id "id1", the workflow for creating the data store will, upon provisioning the necessary resources and configuring the data store, mark the state of id1 as "available" in the Admin data store. As a final step in the create database workflow task, the updateHost API can be invoked at one of the event processors, such as by reaching through an internal virtual IP, to add the data store (and its instances) to the monitoring workflow. By making the updating of monitoring status the final (or at least near-final) step in the provisioning workflow, the availability of the creation, deletion, or modification of an RDS data store is decoupled from the availability of the monitoring data store.

Once the host manager sets the status for an active instance to be monitored, the responsible event processor can periodically ping the host manger for the instance as discussed elsewhere herein. If an instance is unavailable, such as may be due to a host machine crashing or rebooting, the event processor will not get a response for the instance and will write information for the potential problem to the Admin data store. A sweeper will detect the information, and will cause an appropriate recovery workflow to be generated and executed. In one embodiment, a recovery workflow first examines the history of metrics for a data store or data instance, such as information detailing a history of I/O errors for an instance. The workflow then attempts to automatically determine whether the instance is down, such as where there are connection errors, or whether the are no connection problems but an increased number of I/O errors, indicating a potential problem with a particular volume supporting the instance. The tasks of the workflow can attempt to automatically determine and/or isolate the problem, where there are a number of different problems that can occur for a number of different components. Such a determination, as well as the recovery from such problems, is not a trivial matter.

There can be situations, however, where it might not be desirable to automatically recover from a failure. For example, it is possible for an entire data center to fail, where thousands of data stores become unavailable. It can be undesirable to attempt to recover all these data stores at substantially the same time. In one embodiment, the sweeper (or another component of the control plane) can be configured with a maximum number of errors or concurrently executing workflows of a particular type. If a number of workflows exceeds a specified number or threshold, for example, a message or other such notification can be sent or otherwise generated for an operator or DBA, whereby an experienced user can determine the best approach to solving the situation. In one embodiment, the sweeper will run at most a specified number of workflows of the same type at any given time, such as ten workflows of a given type, but will not generate an alarm until a second number, such as twenty-five, or workflows of the same type are requested. A system in accordance with one embodiment provides an operational service dashboard where a DBA or other authorized operator can evaluate the state of the monitoring process(es), and can manually execute recovery actions. Using such an interface, a DBA can select options that enable kicking off workflows, as discussed herein, to perform specific recovery actions. The interface can be used with the control plane to work with multiple disparate database engines and systems, even though the control plane is not in the data path of the data plane. The control plane can monitor error messages and logs, for example, for each of the engines. Such an approach also can allow each data store to be monitored as a whole, concurrently monitoring any replicas of the data store. Different recovery then can be performed based upon the state of the replicas, etc.

It should be recognized that there can be a variety of types of failures that can result in the unavailability or unreliability of a data store or data instance. For example, a host device might fail or reboot, or there might be a problem with the host manager application managing the instance. There also can be a problem with the data store, such as a core dump or segmentation violation (SegV) exception. There also can be problems with the I/O operations or communication paths, or failure of the instance hosting the data store. There also can be various other types of failure, such as failure of a logical volume, a network outage, or an data zone failure. Different workflows can be used to attempt to determine and recover from the different failure types. In one example, the host manager in one embodiment is the gateway to a respective data instance, and failure of this host manager essentially allows for no control over that instance. To address failures such as a Tomcat process running out of memory, a monitoring component of the control plane can ensure that Tomcat is restarted if necessary. The monitoring system can coordinate restarts to avoid unnecessary error or error detection.

Further, as discussed it is not enough to simply detect and recover from a failure, as other factors must be considered, such as the size or scale of the failure. For instance, the recovery action for the failure of a single cloud instance hosting a data store can be substantially different from a recovery action addressing the failure of an entire data zone. For larger problems, the multiple failures may need to be correlated and analyzed such that the recovery actions do not compound the existing problems by trying to concurrently recover the various instances individually. In some cases, it might be desirable to perform a staged recovery, where not only are the number of concurrent processes limited, but the ordering of the processes can be controlled such that no data is lost and no recovery actions are taken that later will need to be corrected due to subsequent recovery actions. It also can be desirable in some cases to localize the recovery process as much as possible. It can be beneficial in at least some embodiments to address a failure locally in a safe manner, when possible. For instance, local recovery actions for simple failures such as failure of a host manager or a data process can be preferred to an action performed by an Admin stack of the overall RDS system.

There also can be various reasons for a data instance, data store, or I/O process to fail, each of which might require a different recovery action. For example, a data store bug can cause the data store to fail, or at least generate a significant number of read/write errors. A data store or instance also can fail due to overloads, bad blocks, or other such situations. There also can be user-induced errors, such as an improper query that results in crashing the data store. In other cases, a data store log volume might be filled or corrupted. To address these and other types of failure, the data processes can be constantly monitored by from host manager. As discussed, each host manager can have a status monitoring component that checks the status of data store or instance, such as by running a get status command (e.g., for MySQL this can take the form of/bin/mysql_admin status). The status monitoring component can periodically check the status, and if an instance is unavailable then the instance can be restarted or otherwise addressed. If an instance repeatedly becomes unavailable, or experiences other such errors, the status monitoring component can stop attempting to correct the error and cause the information to be written to a monitoring or admin data store in the control plane.

To detect data store errors and I/O crashes, the data store error log and/or kernel log can be monitored in some embodiments. Each host manager can run another module that continually scans for certain error types in these two (or other) error logs, and generates the related metrics. For each error type, a pre-defined threshold can be set, beyond which the errors will be sent to an operator for analysis and possible recovery.

A failure detection mechanism in accordance with one embodiment has a number of constraints applied. For example, it can be configured that the monitoring components scale linearly, such that when the number of data instances exceeds the number of hosts a bucket of event processors are set to poll, for example, additional monitoring components can simply be added as desired. Further, it can be established that all data instances are to be monitored constantly, such as by partitioning the data instances and assigning the monitoring ownership of each partition to one of the event processors. As discussed, if an event processor fails for any reason, the partitions owned and monitored by the failed event processor can be redistributed evenly to other available event processors, such as processors in the same bucket. Also, a list of database instances can be kept up-to-date by adding tasks to workflows as RDS customers create and delete data stores and/or instances.

Data Store Partitioning

As is well known in highly-scalable distributed systems, partitioning within a data store only scales to the limits of the physical system in which the data store system resides. Due to this limitation, it can be desirable up front to structure the system in such a way that the system can scale both within a single data storage system, as well as across many data storage systems. Horizontal partitioning of data across distinct data storage systems can contribute to a highly-scalable system which can handle significant demands on the event storage.

A system in accordance with one embodiment utilizes a customer_id as the partition key to partition the data tables, including the list of database instances (db_poll_list), the related events (db_events table), and the security group events table. It can be advantageous to use a customer identifier over a data store identifier, as some events are not restricted to a single data store and may not even concern a particular data store. For instance, a change in a security group does not directly apply to any data store, but may need to be stored as a customer visible event (i.e., retrievable using a DescribeEvents API). Further, a single customer's events may not grow beyond the storage space of a single data store, as in some embodiments event data is only retained for a limited period of time, such as for fourteen days.

There are a number of ways to handle partitioning of data sets across horizontal data store partitions, such as by using bucket partitioning. Bucket partitioning provides an abstraction layer between the data being partitioned and the partitions where the data is being stored. This abstraction layer allows for easier operational management of partitions, such as the addition of new partitions with a migration of data over time, while still allowing for the application to use a hashing mechanism for determining the placement of partitioned data. The implementation of the bucket partition system as described herein comprises components that are specific to certain embodiments, but the overall concept is applicable to many different use cases as should be apparent.

To implement bucket partitioning, a fixed number of buckets can be determined which are to be available to an application. The number of buckets can remain fixed over the life of the application, such that choosing a large enough number can be important in certain embodiments. The number of buckets can reflect an ability to evenly distribute load across all buckets, which can be individually assigned to a smaller number of physical partitions. If there are too many individual instances assigned to the same bucket, then it can become problematic to efficiently store multiple buckets in a single partition. The fixed number of buckets can act as a middle layer between the data to be partitioned and the partitions themselves. A first step in the layering is figuring out how different pieces of data map to the various buckets. As mentioned above, the partition key for the data can be the customer identifier. An efficient and consistent hashing algorithm can be used to provide a value that can be assigned directly to an individual bucket. Whenever a customer identifier hashes to a value assigned to a bucket, that identifier can live in that bucket for the lifetime of the data.

In this example, buckets are assigned to individual workload partitions. There can always be more buckets than partitions, so a mapping can be used to assign many different buckets to individual partitions. To make the assignment configuration concise, ranges of the bucket numbers can be used to assign the buckets to individual partitions. The following illustrates an example table showing how the partitioning assignment can work:

Partition 1={1-25000}

Partition 2={25001-50000}

In this example, bucket numbers 1 through 25,000 are assigned to "Partition 1" while bucket numbers 25,001 through 50,000 are assigned to "Partition 2." Whenever data needs to be added to the system and the hash of the customer identifier maps the workflow instance to bucket 100, for example, any data related to that customer (including data stores and security groups) can be inserted into tables which physically live in "Partition 1." Such an approach also can be used to read any information regarding a customer's database or security groups, where a request for the events for a given customer whose identifier hashes to bucket 100 will be read from "Partition 1".

The above example deals with a relatively simple case, with the initial assignment of buckets to partitions being unchanged. Sometimes, however, a new partition will need to be added to the system to alleviate the burden on the other partitions. Using this example above, a new partition "Partition 3" can be added to take load off of the other two partitions:

Partition 1={1-16666}

Partition 2={33333-50000}

Partition 3={16667-33333}

As can be seem, 8334 buckets (numbers 16667 through 25000) have been taken from "Partition 1" and re-assigned to "Partition 3." Also, 8333 additional buckets (numbers 25001 through 33333) have been taken from "Partition 2" and reassigned to "Partition 3." This reassignment could have been based on the buckets which were most busy or most full, but in this example there was a relatively even redistribution of buckets across partitions.

As the bucket assignment changes, the data residing in the physical partition can be affected. In an example above, bucket 100 was used to store the information for a customer whose identifier hashed to 100. In this repartitioning scenario, the data would not be affected since bucket 100 stayed on "Partition 1." There may have been data in bucket 11000, however, and any data written prior to the repartitioning lives in "Partition 1", but any data written after the repartitioning will exist in "Partition 3". To resolve this issue with previous data existing in one partition and current data existing in another partition, the system can allow for more than one partition to be assigned to a bucket. A given bucket can have at least two partitions, a current partition and a previous partition. In the present example, the repartitioning would result in buckets 10001 through 15000 having two partitions assigned, with "Partition 3" as the current partition, and "Partition 1" as the previous partition. As mentioned, any new data for bucket 11000 will be in the current partition, while any data written prior to repartitioning will be in the previous partition. When a query for events or any information maps to bucket 11000, it can be important to check the current partition for that data, as well as to check the previous partition since the record could exist there as well. Such support for multiple partition lookups in a bucket can incur the potential cost of misses for those instances which end up in the previous partition for a given bucket. Since any newly created events are being written to the current partition, however, the cost of a miss will only be incurred for workflow instances running when the repartitioning happens or for closed workflows. Favoring newly created events can improve performance while still allowing the flexibility to do repartitioning efficiently.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   a plurality of computing devices, respectively comprising one or more processors and a memory, that implement a cloud-based database service;
   wherein the cloud-based database service is configured to:
      detect a failure of a first replica of a database in a first data zone comprising a first one or more data centers, wherein the database is synchronously replicated to a second replica of the database in a second data zone comprising a second one or more data centers, wherein the second data zone is selected out of a plurality of data zones offered by a database service that hosts the database via an interface of the database service and wherein the selection of the second data zone is to create the second replica of the database in the second data zone;
      responsive to the detection of the failure:
         perform a failover to the second replica of the database in the second data zone from the first replica of the database in the first data zone; and
         route client requests directed to the database to the second replica of the database in the second data zone instead of the first replica of the database in the first data zone without requiring a change in an address used by the clients to access the database at the first replica of the database in the first data zone prior to performing the failover.

2. The system of claim 1, wherein the cloud-based database service is further configured to monitor health of the first replica of the database, wherein the failure of the first replica of the database is detected as a result of the monitoring.

3. The system of claim 1, wherein the cloud-based database service is further configured to store an event indicative of the failure of the first replica as part of a log accessible via an interface.

4. The system of claim 1, wherein the cloud-based database service is further configured to receive a request that enables replication of the database across the first data zone and second data zone.

5. The system of claim 1, wherein the cloud-based database service is further configured to receive a request to create the database that specifies a replication parameter set to "true".

6. The system of claim 1, wherein the cloud-based database service is further configured to provide information regarding the failure in further response to the detection of the failure.

7. The system of claim 1, wherein the second replica is a standby replica.

8. A method, comprising:
  detecting, at a cloud-based database service, a failure of a first replica of a database in a first data zone comprising a first one or more data centers, wherein the database is synchronously replicated to a second replica of the database in a second data zone comprising a second one or more data centers, wherein the second data zone is selected out of a plurality of data zones offered by a database service that hosts the database via an interface of the database service and wherein the selection of the second data zone is to create the second replica of the database in the second data zone;
  responsive to detecting the failure:
    performing, by the cloud-based database service, a failover to the second replica of the database in the second data zone from the first replica of the database in the first data zone; and
  routing, by the cloud-based database service, client requests directed to the database to the second replica of the database in the second data zone instead of the first replica of the database in the first data zone without requiring a change in an address used by the clients to access the database at the first replica of the database in the first data zone prior to performing the failover.

9. The method of claim 8, further comprising monitoring health of the first replica of the database, wherein the failure of the first replica of the database is detected as a result of the monitoring.

10. The method of claim 8, further comprising storing an event indicative of the failure of the first replica as part of a log accessible via an interface.

11. The method of claim 8, further comprising receiving a request that enables replication of the database across the first data zone and second data zone.

12. The method of claim 8, further comprising receiving a request to create the database that specifies a replication parameter set to "true".

13. The method of claim 8, further comprising providing information regarding the failure in further response to the detection of the failure.

14. The method of claim 8, wherein the second replica is a standby replica.

15. One or more non-transitory computer-readable storage media storing program instructions that, when executed on or across one or more computing devices, cause the one or more computing devices to implement a cloud-based database service:
  detecting, at the cloud-based database service, a failure of a first replica of a database in a first data zone comprising a first one or more data centers, wherein the database is synchronously replicated to a second replica of the database in a second data zone comprising a second one or more data centers, wherein the second data zone is selected out of a plurality of data zones offered by a database service that hosts the database via an interface of the database service and wherein the selection of the second data zone is to create the second replica of the database in the second data zone;
  responsive to detecting the failure:
    performing, by the cloud-based database service, a failover to the second replica of the database in the second data zone from the first replica of the database in the first data zone; and
  routing, by the cloud-based database service, client requests directed to the database to the second replica of the database in the second data zone instead of the first replica of the database in the first data zone without requiring a change in an address used by the clients to access the database at the first replica of the database in the first data zone prior to performing the failover.

16. The one or more non-transitory computer-readable storage media of claim 15, storing further program instructions that when executed on or across the one or more computing devices, cause the one or more computing devices to further implement monitoring health of the first replica of the database, wherein the failure of the first replica of the database is detected as a result of the monitoring.

17. The one or more non-transitory computer-readable storage media of claim 15, storing further program instructions that when executed on or across the one or more computing devices, cause the one or more computing devices to further implement storing an event indicative of the failure of the first replica as part of a log accessible via an interface.

18. The one or more non-transitory computer-readable storage media of claim 15, storing further program instructions that when executed on or across the one or more computing devices, cause the one or more computing devices to further implement receiving a request that enables replication of the database across the first data zone and second data zone.

19. The one or more non-transitory computer-readable storage media of claim 15, storing further program instructions that when executed on or across the one or more computing devices, cause the one or more computing devices to further implement receiving a request to create the database that specifies a replication parameter set to "true".

20. The one or more non-transitory computer-readable storage media of claim 15, storing further program instructions that when executed on or across the one or more computing devices, cause the one or more computing devices to further implement providing information regarding the failure in further response to the detection of the failure.

* * * * *